(12) United States Patent
Frisken

(10) Patent No.: US 7,593,608 B2
(45) Date of Patent: Sep. 22, 2009

(54) OPTICAL COMMUNICATIONS SYSTEM

(75) Inventor: Steven J. Frisken, Eveleigh (AU)

(73) Assignee: Finisar Corporation, Horsham, PA (US)

( * ) Notice: Subject to any disclaimer, the term of this patent is extended or adjusted under 35 U.S.C. 154(b) by 0 days.

(21) Appl. No.: 12/253,218

(22) Filed: Oct. 16, 2008

(65) Prior Publication Data
US 2009/0097850 A1 Apr. 16, 2009

Related U.S. Application Data

(62) Division of application No. 11/069,608, filed on Feb. 28, 2005, now Pat. No. 7,447,401.

(51) Int. Cl.
*G02B 6/26* (2006.01)
(52) U.S. Cl. .............................. 385/27; 398/81; 385/31
(58) Field of Classification Search .................. 385/27, 385/37, 14, 31; 398/81
See application file for complete search history.

(56) References Cited

U.S. PATENT DOCUMENTS

| | | | |
|---|---|---|---|
| 5,132,824 A | 7/1992 | Patel et al. | |
| 5,682,262 A | 10/1997 | Wefers et al. | |
| 5,689,361 A | 11/1997 | Damen et al. | |
| 5,828,474 A | 10/1998 | Prucnal et al. | |
| 6,175,437 B1 | 1/2001 | Diels et al. | |
| 6,275,623 B1 | 8/2001 | Brophy et al. | |
| 6,307,984 B1 | 10/2001 | Watanabe | |
| 6,327,019 B1 | 12/2001 | Patel et al. | |
| 6,417,945 B2 | 7/2002 | Ishikawa et al. | |
| 6,529,307 B1 | 3/2003 | Peng et al. | |
| 6,621,622 B2 * | 9/2003 | Krummrich | 359/337.4 |
| 6,626,592 B2 | 9/2003 | Watanabe | |
| 6,654,564 B1 | 11/2003 | Colbourne et al. | |
| 6,659,614 B2 | 12/2003 | Katayama et al. | |
| 6,748,140 B1 | 6/2004 | Wu et al. | |

(Continued)

FOREIGN PATENT DOCUMENTS

WO 0104674 A1 1/2001

(Continued)

OTHER PUBLICATIONS

Killey, R.I., et al., Nonlinear Signal Distortion in WDM Transmission With 10- and 40- Gbit/s Channel Rates, 2000, London Communications Symposium, 5 pages.

(Continued)

*Primary Examiner*—Ellen Kim
(74) *Attorney, Agent, or Firm*—Kurt Rauschenbach; Rauschenbach Patent Law Group, LLC

(57) ABSTRACT

In an optical communications link, an optical system including: at least a first input port for delivering an optical signal travelling in the communications link, the optical signal including a plurality of wavelength channels, the channels being utilized for carrying optical information over an optical data link; a dispersive element for spatially separating the wavelength channels; an active optical-phase element; and a plurality of optical manipulation elements for directing the spatially separated channels between the dispersive element and the optical phase element wherein, the optical phase element independently modifies the phase of predetermined ones of the wavelength channel in a predetermined and decoupled manner for substantial compensation of signal degradation effects imparted to the wavelength channels by said communications link.

7 Claims, 12 Drawing Sheets

U.S. PATENT DOCUMENTS

| | | |
|---|---|---|
| 6,768,874 B1 | 7/2004 | Colbourne et al. |
| 6,807,340 B2 | 10/2004 | Postolek et al. |
| 6,823,144 B2 | 11/2004 | Stuart |
| 6,826,209 B1 | 11/2004 | Morita et al. |
| 6,832,051 B2 | 12/2004 | Lu et al. |
| 6,847,763 B2 | 1/2005 | Eggleton et al. |
| 2002/0044342 A1* | 4/2002 | Krummrich ................. 359/337 |
| 2002/0093706 A1 | 7/2002 | Lu et al. |
| 2002/0159701 A1 | 10/2002 | Katayama et al. |
| 2003/0021526 A1 | 1/2003 | Bouevitch |
| 2003/0095305 A1 | 5/2003 | Kewitsch et al. |
| 2003/0174939 A1 | 9/2003 | Moon et al. |
| 2004/0076373 A1* | 4/2004 | Blow et al. .................... 385/27 |
| 2005/0095009 A1 | 5/2005 | Powell et al. |
| 2005/0243417 A1 | 11/2005 | Massenot et al. |
| 2006/0045416 A1* | 3/2006 | Lee et al. ...................... 385/24 |
| 2006/0067611 A1 | 3/2006 | Frisken et al. |

FOREIGN PATENT DOCUMENTS

| | | |
|---|---|---|
| WO | 2004047349 A1 | 6/2004 |
| WO | 2005122451 A1 | 12/2005 |

OTHER PUBLICATIONS

Moss, D., et al., Tunable Dispersion Compensation At 10 Gbit/s and 40 Gbit/s Using Multicavity All-pass Etalons, 2003, Presentation TuD1, Conference on Optical Fiber Communication (OFC), 2 pages.

Wen, Y.J. et al., Dispersion Map Optimization In WDM Transmission Systems, 2002, Presentation TuI2, IEEE/LEOS Annual Meeting, 2 pages.

* cited by examiner

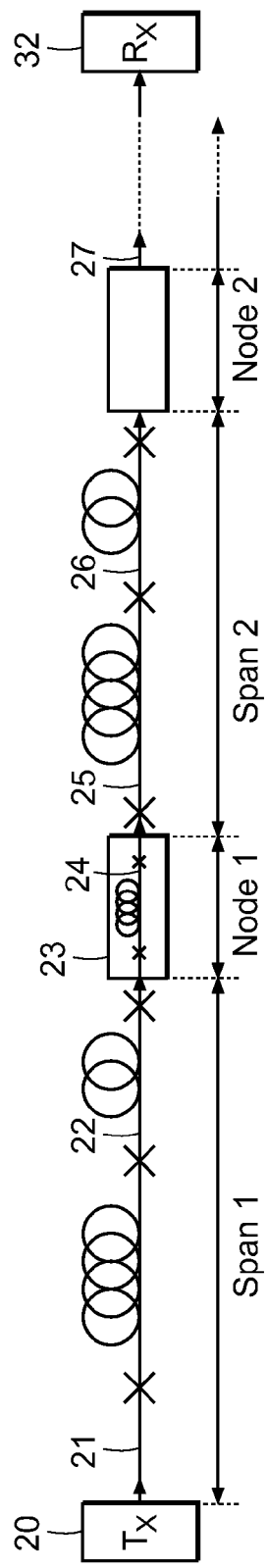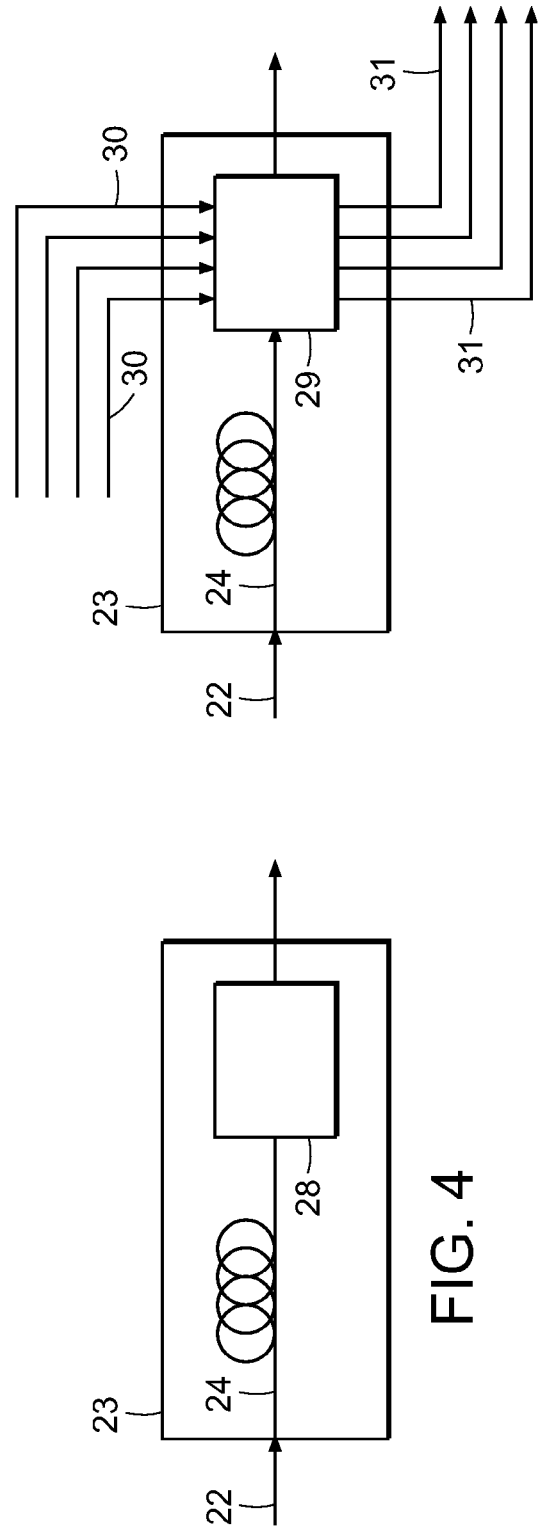
FIG. 3
FIG. 4
FIG. 5

OPTICAL COMMUNICATIONS SYSTEM

CROSS-REFERENCES TO RELATED APPLICATIONS

This application is divisional patent application of U.S. patent application Ser. No. 11/069,608, filed on Feb. 28, 2005, entitled Optical Communications System. The entire disclosure of U.S. patent application Ser. No. 11/069,608 is incorporated herein by reference.

FIELD OF THE INVENTION

The current invention relates to optical communication systems and in particular to fiber optic communication systems. The optical communications system of the present invention utilizes a property of the nonlinear Schrödinger equation whereby the individual signals in a wavelength division multiplexing (WDM) system are decoupled from each other and individually corrected for dispersive and nonlinear effects accumulated along each span of the optical network.

BACKGROUND OF THE INVENTION

The recent growth in the demand for broadband services has resulted in a pressing need for increased capacity on existing communication channels. The increased bandwidth of optical fiber communication links are still often insufficient to cope with this demand without utilizing the ability of these fibers to carry large numbers of individual communication channels, where each channel is identified by the particular wavelength of the light. This technique is known as dense wavelength division multiplexing (DWDM).

Linear optical fiber communication technologies are essentially based on the same principles as radio frequency systems. Fiber communication systems, however, are fundamentally different, because they make positive use of the inherent optical fiber property of nonlinearity. Rapid progress in nonlinear lightwave communications is stimulated by increasing demand for telecommunications services. Practical and research interest is directed mostly toward two main goals: development of effective high capacity long-haul transmission systems and the upgrade of existing terrestrial fiber networks.

There are three major factors that cause optical signal degradation and distortion in long-haul high bit-rates fiber communication systems:

Loss due to absorption in the fiber;
Group-velocity dispersion (GVD); and
Optical nonlinearity.

Signal power attenuation due to absorption can be compensated using amplifiers, although recovery is not complete since amplified spontaneous emission noise is added to the signal and degrades the signal-to-noise ratio. Revolutionary developments in nonlinear lightwave communications have been triggered by the development and deployment of optical amplifiers providing periodic amplification of optical signals. The portion of the optical link between each amplifier is commonly known as a span, where each successive amplifier at a node position amplifies the optical signals that have degraded by propagation through the previous span.

Until the invention of the erbium-doped fiber amplifier (EDFA), optical signals were regenerated electronically to overcome the attenuation in the silica fiber. Electronic regenerators have two important drawbacks: they are expensive and they limit system performance, because each regenerator can operate at only one predetermined bit-rate, in one data modulation format and at one operating wavelength.

Because the EDFA has many important advantages (such as large bandwidth, high gain, simplicity and others) over optoelectronic regenerators, they quickly became the amplifier of choice in communication systems. As a result, fiber loss is no longer a major limitation in optical fiber transmission and the performance of optical amplifier systems is then limited by CD and nonlinearity. Note that whereas a regenerator re-creates a perfect digital output signal, the fiber amplifier uses whatever it receives. Therefore, dispersive pulse broadening and other degrading effects are accumulated along a fiber line.

There are two principal approaches to overcome these limitations: in the first instance, both the chromatic dispersion (CD) and nonlinearity are considered to be detrimental factors, however, due to short fiber lengths and small optical intensities in the fiber, the nonlinear effects are only small and therefore are ignored. This is known as a linear approach. In the second approach, the nonlinear and dispersive effects are recognized under certain conditions as being reciprocal effects that can be counterbalanced by appropriate design of the link architecture. Such systems are called nonlinear since the nonlinear effects that are detrimental in the linear systems are used to improve transmission characteristics of the optical communication system.

As the demands on the capacity of the communications links increases further, the modulating frequency of the optical signals must increase. Current standard systems operate at data transmission rates of 10 Gbits per second per channel so that, in a DWDM network containing 50 channels, the total transmission capacity of the link is 500 Gbits/second. The next evolution in communications links requires this to increase and the next goal is to have reliable links operating at 40 Gbits/s per channel. At this data rate, electronic components used in repeaters and at the receiving end of the link struggle to keep pace with the amount of data being transmitted. Thus the demand is to be able to transmit the information through the link in wholly optical form, without any conversion to an electronic signal. This will certainly be required for the further generations of optical communications links where data rates of 100 Gbits/s per channel and greater are predicted.

A light pulse is an electromagnetic wave packet built from a continuum of elementary optical carriers oscillating at different frequencies. In other words, any optical wave-packet contains a range of frequency components. Since any optical fiber is a dispersive medium, each of these spectral components travel at different group velocities, causing the pulse energy to spread over time as the pulse propagates through the medium. Fiber GVD is measured either in units of picoseconds squared per kilometer ($ps^2/km$) or picoseconds per kilometer per nanometer (ps/km.nm). Roughly speaking, a pulse with the bandwidth 1 nm spreads by corresponding number of ps over 1 km. Dispersion can be positive where low frequencies travel at a higher speed than high frequencies or negative where high frequencies propagate at a higher speed than low frequencies. The dispersion of standard single mode fiber (SMF) is positive (also called normal) for wavelengths shorter than about 1300 nm and negative (anomalous) for wavelengths longer than 1300 nm. SMF has dispersion of about 20 $ps^2/km$ at wavelength 1550 nm. Corresponding dispersive spreading of a 10 ps pulse in SMF after 125 km is about 50 ps or, in other words, 5 times its original width. Such a large spreading can lead to overlapping in the time domain of neighboring bits and consequently to degradation of the information signal.

Linear signal distortion caused by the GVD in fiber transmission systems can be almost suppressed by the dispersion compensation or dispersion mapping technique. Optimization of the system performance in the case of a linear transmission requires minimization of the CD of the optical communications link. This can be achieved by operating close to the zero dispersion point or/and additional compensation of the accumulated dispersion. The idea to use a compensating fiber to overcome dispersion of the transmission fiber was proposed in 1980. In the low power linear regime where the response of the fiber is linear, compensation of dispersion aims to prevent dispersive broadening of the signal in the transmission fiber by the compression in the compensating fiber.

In linear systems dispersive broadening can largely be eliminated by dispersion compensation. However, the nonlinear effects can still be the primary reason for signal degradation especially in long-haul transmission systems. The response of the optical medium is not exclusively linear. The fiber refractive index instantaneously increases by an amount proportional to the optical power. This phenomenon is known as the optical Kerr effect. Modulation of the optical power leads to the corresponding modulation of the index. For instance, a high power light pulse increases the refraction index with corresponding change of the phase of the propagating pulse. This effect is known as self-phase modulation (SPM).

SPM involves an interaction of an optical pulse with itself. SPM of an optical pulse does not cause any degradation of other bit-pulses of optical signals of different frequencies propagating through the link and so does not significantly contribute to the interchannel cross-talk degradation. When the dispersion map of an optical link is designed, the dispersive effects of the individual components that make up each span in the map are considered and selected to optimize the SPM to acceptable levels across the whole link. SPM can even be beneficial when the wavelength of the signal pulses falls in the anomalous region of the optical fiber characteristics as it can partially compensate effects of CD in the pulse by delaying the 'fast' spectral components relative the 'slow' components.

The dispersion compensation technique has been used relatively successfully both in long-haul communication systems and in the existing terrestrial optical links, most of which are based on standard telecommunication fiber with large dispersion in the optical window around 1550 nm. The basic optical-pulse equalizing system consists of a transmission fiber, which is typically standard SMF already existing in the installed link, and one or more lengths of equalizing fiber possessing a large dispersion coefficient of opposite sign known as dispersion compensating fiber (DCF).

Prior art dispersion management schemes such as those disclosed in U.S. Pat. Nos. 6,832,051 to Lu et al and 6,417,945 to Ishikawa et al, while being effective for single channel fiber communication systems, have at least one shortcoming with regard to multi-channel systems. Specifically, complete correction of dispersion in all channels at the end of the system is not easily accomplished, primarily because the dispersion slope in the compensating fibers typically cannot meet the two requirements of being both high in magnitude and negative in sign. Thus, fibers with high negative dispersion and high negative slope are difficult to manufacture and therefore expensive. Small variations in fibers with these properties typically lead to large changes of other properties of the fiber, and hence are typically not reliably manufacturable. Also, there is a large installed base of SMF fiber, and even if DCF were easier to manufacture, replacing of the existing outside cable plant would be very costly.

A further disadvantage of using dispersion-compensated fiber (DCF) includes the added loss associated with the splicing to the initial fiber length and the increased fiber span. Thus, the amplifier stage in each span of the communications link must also compensate for this additional loss. Additionally, the nonlinear effects may degrade the signal over the long length of the fiber if the signal is of sufficient intensity.

A dispersion management scheme that has been applied to a multiple channel transmission system is disclosed in U.S. Pat. No. 6,659,614 to Katayama. This patent discloses separating the individual wavelength channels in the signal and directing them onto a single deformable mirror. The mirror is then deformed into a substantially parabolic shape to correct for large-scale optical dispersion across the whole optical transmission window of the communications link. This patent, however, does not teach individual control over each channel independently. As such the ability to control different transmission impairments is limited.

US Patent Application 2003/0170939 to Moon et al discloses a chromatic dispersion compensation device based on a micromirror array. Moon provides a system whereby each of the dispersed wavelength channels is incident on a plurality of micromirror "pixels" which are switched between one of two positions to delay part of the light incident on the array by a predetermined amount and partially compensate for chromatic dispersion in a wavelength channel through providing a number of quantized phase levels.

Disclosures by Katayama or Moon et al. both rely on mechanical adjustments of mirrors which is disadvantageous in a high reliability Telecommunications environment and furthermore neither teach the advantageous use of smooth adjustment of phase within a channel to vary group delay in combination with control of the relative group delay or relative phase between wavelength channels or the simultaneous compensation of a variety sources of optical signal degeneration in an optical communications link.

Other techniques used for dispersion compensation at each node in the dispersion map include:
  Multiple-Cavity Etalons, which includes Gires-Tournois Interferometers (GTIs), such as those disclosed in U.S. Pat. No. 6,768,874, 6,748,140 or 6,654,564, and by D. Moss et al, Presentation TuD1 entitled "Tunable Dispersion Compensation at 10 Gbit/s and 40 Gbit/s Using Multicavity All-pass Etalons", Conference on Optical Fiber Communication (OFC) 2003, Atlanta Ga., USA; or
  Chirped Fiber Bragg Gratings (CBFGs) such as those disclosed in U.S. Pat. No. 6,847,763 or 6,807,340.

The GTI is a bulk optics element that can be configured to operate in either reflective or transmissive mode and compensates for dispersion through wave interference mechanisms. Since it is a bulk optic element, it can be configured to provide a high compensating dispersion through a relatively short propagation distance. Additionally, it can be constructed such that the dispersion at a given center wavelength is tunable. The most practical mode in which a GTI is used is in reflection where the back face of the resonator is 100% reflective, however these suffer from high insertion losses due to the need to isolate the back propagating signal. This can be partially compensated by the use of optical circulators, however, GTIs suffer from the fundamental disadvantage that the effective bandwidth decreases as the dispersion is increased.

In contrast, the CFBG can be designed to simultaneously have a high dispersion and large bandwidth. It does, however, still operate in the reflective mode and so still suffers from the insertion losses and the need for optical circulators within the span. Fiber Bragg gratings can also induce dispersion ripple, which leads to undesirable distortion of the optical signals.

All these existing dispersion compensating techniques, however, possess a common problem. Since the amount of dispersion that each optical channel experiences depend on the frequency of the channel, it is extremely difficult to completely return all the channels to a common dispersion value at each node. This effect is depicted in FIG. 1 which shows the (exaggerated) GVD over two spans in a dispersion managed optical communications link. A plurality of optical channels are shown $\omega_1$ to $\omega_4$ (where $\omega_1 < \omega_4$). As the optical signals propagate through the SMF 1 of Span 1, the signals of higher frequency experience a greater GVD. When the signals reach the length of DCF 2, the highly negative dispersion partially reduces the GVD. The problem lies with the difficulty in correcting for the GVD across all the optical channels and so the signals enter the next span of the link with a GVD mismatch indicated by the 3. As the signals pass through multiple spans of the link, the GVD mismatch increases as can be seen at the end 4 of the length of DCF fiber 5.

The total GVD mismatch accumulated through all the spans of the link need to be compensated at the final receiver stage of the system. At present, this is achieved by separating each of the DWDM channels on the link and feeding them into separate electronic dispersion compensators. Again, these electronic systems are adequate for current data rates of 10 Gbits/s, but struggle at increased data rates of 40 Gbits/s and upward. Thus, the need for all optical dispersion and GVD compensators for further advances in optical communications systems is paramount.

As has been discussed, the detrimental effects of the optical fiber link in current systems are managed by modeling of the whole optical communications link and inserting lengths of fiber into the link at regular intervals to amplify the pulse to counter the effects of optical loss in the fiber in the time domain, and optical dispersion in the frequency domain. This is a valid method, provided that the optical signals propagating through the link experience all the spans as designed.

In reconfigurable networks, where optical signals can be added and dropped to the link at any number of stages along its length by reconfigurable add/drop multiplexers (ROADMs), the dispersion map is less valid. The optical signals have not propagated through each stage to get the benefit of the carefully designed dispersion and GVD properties of the link as a whole. Extra care must be given to these signals to determine their properties once they have been dropped from the link and compensated to avoid loss of the information they contain.

Co-Pending Application

Various methods, systems and apparatus relating to the present invention are disclosed in the co-pending U.S. application Ser. No. 10/706,901 filed on 12 Nov. 2003 by the applicant or assignee of the present invention. The disclosures of this co-pending application are incorporated herein by cross-reference.

BRIEF SUMMARY OF THE INVENTION

It is an object of the present invention to provide an improved optical communications system.

In accordance with a first aspect of the invention there is provided an optical system including: an input port for accepting an optical signal, the optical signal including a plurality of wavelength channels, each wavelength channel having a predetermined spectral width; a plurality of individually addressable phase control elements for discretely modifying the phase of each of the wavelength channels independently, where the modification is performed at a scale less than that of the spectral width of each channel to provide a plurality of phase-modified wavelength channels; and at least one output port for distributing selected ones of the phase-modified wavelength channels to an optical communications link.

Preferably, the phase control element further discretely and substantially independently modifies the amplitude of selected ones of the wavelength channels in accordance with requirements In accordance with a second aspect of the invention there is provided an optical communication system including a plurality of optical systems, where each of the optical systems is distributed at discrete locations in the communications system.

In accordance with a third aspect of the invention there is provided an optical compensation system including: an optical input port for receiving an optical signal, the optical signal having a plurality of optical channels; an optical dispersion element for spatially dispersing the optical channels; an optical compensation element for individually modifying the relative phase of each optical channel to produce a series of spatially dispersed phase modified optical channels; and an optical combining element for combining the spatially dispersed phase modified optical channels to produce an optical output signal.

Preferably, the optical dispersion element and the optical combining element are both selected from the group consisting of an optical grating and a grism.

More preferably, the optical compensation element includes a series of spatially dispersed relative phase manipulation elements for each spatially dispersed optical channel, where the phase manipulation elements are capable of independently manipulating spatially distinct portions of a spatially dispersed optical channel.

In accordance with a fourth aspect of the invention there is provided a method of selectively compensating a plurality of optical channels contained in an optical signal, the optical signal propagating in an optical communications link including the steps of:
  a) receiving the optical signal on an input port of an optical wavelength processor;
  b) spatially dispersing he optical channels in the optical signal along a dispersion axis;
  c) directing each of the spatially dispersed optical channel onto a predetermined region of an optical phase manipulation device, the optical phase manipulation device including a plurality of independently addressable pixel elements;
  d) setting each of the pixel elements to one of a plurality of predetermined levels such that the phase of the light incident on each pixel element is modified by a predetermined amount to compensate for degenerative effects accumulated in the optical communications link to provide a plurality of compensated optical channels;
  e) recombining the compensated optical channels to provide an optical output signal; and
  f) outputting the optical output signal on an output port.

Preferably, the relative group velocity dispersion mismatch between selected adjacent pairs of the optical channels is controlled. More preferably, the relative phase of one of the optical channels in each pair of channels receives an additional phase shift. More preferably still, the group velocity mismatch is adjusted to be substantially zero and the phase shift is substantially pi radians.

The pixel elements are preferably addressed by a group delay function that is substantially continuous within a wavelength channel and provides the ability to control the pixel elements substantially discontinuously between adjacent channels. Preferably, the group velocity dispersion mismatch and phase between selected pairs of next adjacent optical channels are controlled. The degenerative effects preferably include one or more of chromatic dispersion, group velocity delay, optical nonlinearity, cross-phase modulation and self-phase modulation.

Preferably, the spatially dispersed optical channels are modified on a scale less than the spectral width of the bandwidth of each channel. More preferably, the pixel elements are arranged spatially into columns, the columns of pixel elements being angularly oriented with respect to the dispersion axis to substantially reduce phase quantization effects of the compensation imparted to each optical channel. More preferably still, the optical phase manipulation device modifies selected ones of he spatially dispersed optical channels along an axis orthogonal to the dispersion axis such that the direction of propagation is modified to provide a plurality of optical output signals. Still more preferably, each of the optical output signals is output on a predetermined one of a plurality of output ports.

In accordance with a fifth aspect of the invention there is provided in an optical transmission system including: an optical transmitter for transmitting a plurality of independent wavelength channels; at least first and second spans, each span respectively including: at least a first length of transmission optical fibre characterized by a positive dispersion coefficient; and at least a first length of dispersion-compensating optical fibre disposed after the length of transmission fibre and characterized by a negative dispersion coefficient for substantially compensating a large proportion of the group velocity delay accumulated by each wavelength channel in the first span; a first node module disposed after the first span including: an optical amplifying module; and a phase manipulation module for:
  a. substantially compensating for dispersion of each wavelength channel accumulated in the first span;
  b. substantially compensating for the remaining accumulated group delay in selected pairs of first and second wavelength channels; and
  c. modifying the phase of the second wavelength channel in the selected pair such that the cross talk between the selected pair of channels generated in the first link is at least partially compensated in the second link.

The system preferably further includes a second node module disposed after the second span including; an optical amplifying module; and a phase manipulation module for substantially compensating for the remaining accumulated group delay in selected pairs of third and fourth wavelength channels and for modifying the relative phase of the wavelength channels.

Preferably the system also includes: a plurality of sequentially disposed pairs of the first and second spans, each interspersed between one of a plurality of respective first and second node modules; and a receiver module for receiving the transmitted wavelength channels.

In accordance with a sixth aspect of the invention there is provided an optical transmission system including: an optical transmitter for transmitting a plurality of independent wavelength channels; at least first and second lengths of transmission optical fibre characterized by a first predetermined dispersion coefficient; at least first and second lengths of dispersion-compensating optical fibre characterized by a second predetermined dispersion coefficient for substantially compensating a large proportion of the group velocity delay accumulated by each wavelength channel in respective lengths of transmission optical fibre, the first length of dispersion compensating fibre disposed after the first length of transmission fibre and the second length of dispersion compensating fibre disposed after the second length of transmission fibre; a first node module interposed between the first length of dispersion compensating fibre and the second length of transmission fibre including: a phase manipulation module configured to: substantially compensate the chromatic dispersion accumulated by each of the wavelength channels in the first length of transmission fiber; substantially compensate for the remaining accumulated group delay in selected pairs of first and second wavelength channels; modifying the phase of the second wavelength channel in the selected pair such that the modified phase of the second channel is substantially out of phase with the first wavelength channel in the selected pair; and a second node module disposed after the second length of dispersion compensating fibre including; an optical amplifying module; and a phase manipulation module for substantially compensating for the remaining accumulated group delay in selected pairs of third and fourth wavelength channels and for modifying the phase of the wavelength channels such that the modified phase of all the wavelength channels are substantially in-phase.

Preferably, the phase manipulation module modifies the phase of the wavelength channels in a decoupled manner such that nonlinear optical effects accumulated by any of the wavelength channels in the first length of transmission fibre are reversed in the second length of transmission fibre. More preferably, the first and second predetermined dispersion coefficients are of opposite sign.

In accordance with a seventh aspect of the invention there is provided in an optical communications link, an optical system including: at least a first input port for delivering an optical signal travelling in the communications link, the optical signal including a plurality of discrete wavelength channels, each channel for carrying optical information over an optical data link; a dispersive element for separating each channel from the optical signal; an active optical-phase element; and a plurality of optical manipulation elements for directing the separated channels between the dispersive element and the optical phase element wherein, the optical phase element independently modifies the phase of each of wavelength channel in a discrete and decoupled manner for substantial compensation of dispersive and nonlinear characteristics imparted to the wavelength channels by the communications link.

Preferably, the optical phase element independently modifies the group delay of the wavelength channel. More preferably, the optical phase element independently modifies the dispersion of the wavelength channel. Still more preferably, the optical phase element independently modifies the amplitude of the wavelength channel.

The system preferably includes further optical manipulation elements for directing the modified wavelength channels to a further dispersion element. More preferably, the further dispersion element combines selected wavelength channels to form an optical output signal, the optical output signal being directed to one of a plurality of optical output ports.

BRIEF DESCRIPTION OF THE DRAWINGS

Further features and advantages of the present invention will become apparent from the following detailed description of preferred embodiments of the invention, taken in combination with the appended drawings in which:

FIG. 3 is a schematic of the components in a typical telecommunication link.

FIG. 4 shows a detail of a node of the telecommunications link of FIG. 3 including an embodiment of the present invention.

FIG. 5 shows a detail of a node of the telecommunications link of FIG. 3 including a second embodiment of the present invention.

DETAILED DESCRIPTION OF THE INVENTION

The preferred embodiments provide for an improved optical communications system which may have the following advantages:

Compensation of dispersion effects on a channel-by-channel basis.
Mitigation of nonlinear four-wave mixing effects.
Be reconfigurable to dynamically adjust each individual wavelength channel independently to account for mismatches in current dispersion compensation techniques or thermally induced variations.
Be able to accommodate optical signals that have been added to the link at various add/drop locations and compensate for dispersive and nonlinear effects that have not experienced the full length of the dispersion-managed system.
Independent control over both amplitude and phase of DWDM signals on a channel-by-channel basis.

Figure 17:
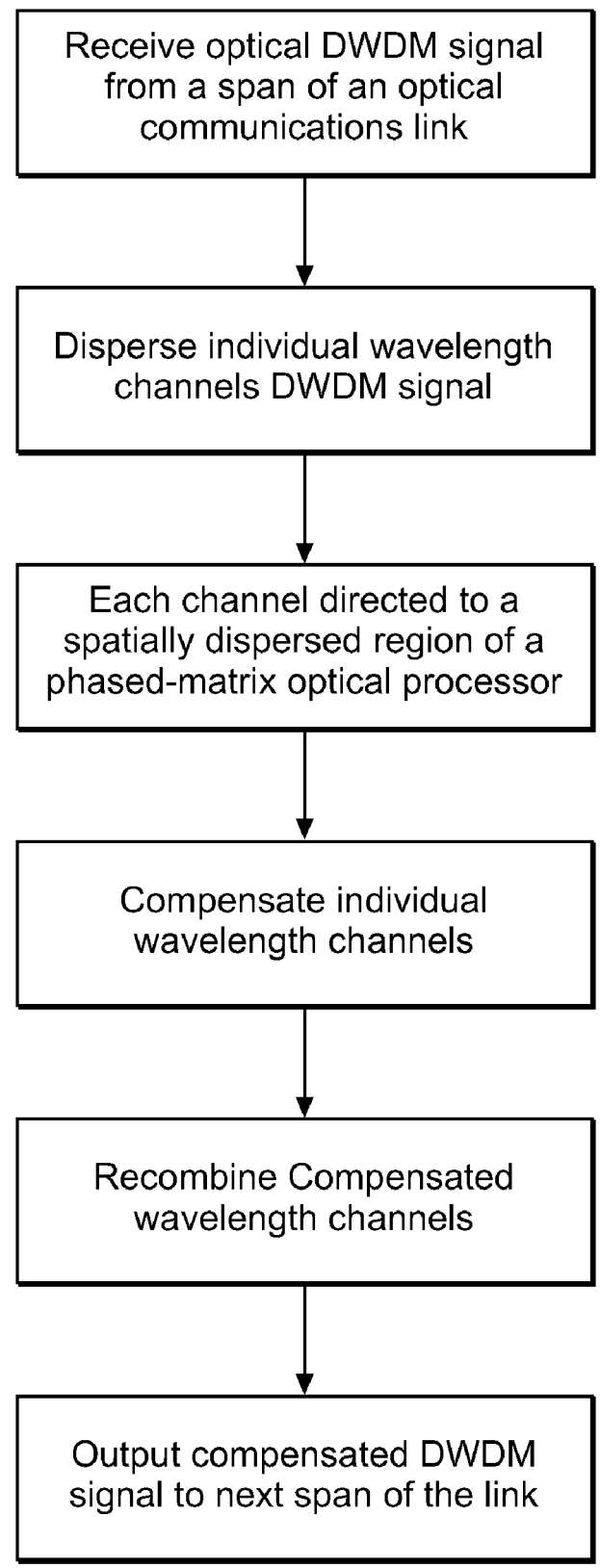
FIG. 17 is an overview of the optical compensation method of the preferred embodiments of the invention.

The preferred embodiments of the present invention disclose methods of realizing the characteristics of an improved optical communications system by providing means of controlling the relative phase of received optical signals both on the scale of the individual wavelength channels, and also independently controlling the relative phase on a scale less than that of the spectral width of each of the individual channels. Advantageously discrete amplitude control of each channel can also be provided for power level balancing between optical channels to suppress the 4 wave mixing components and to optimize the signal to noise ratio of all channels. The preferred embodiments provide an electronically controllable method of phase and amplitude control over the individual optical wavelength channels without the need to first convert each optical channel into an electronic signal. This unique property enables unparalleled scope for increased communications bandwidth over optical communication links to deal with the ever-increasing demand on communications services. An overview of the method is depicted in FIG. 17.

Overview

In the most general case, signal transformation along the fiber communication link is caused by a combined action of dissipation and amplification, dispersion and nonlinearity and cannot be described in a simple way. The basic mathematical model that forms the theoretical background for fiber optic communications is the nonlinear Schrödinger equation (NLSE). Optimization of the optical transmission system parameters is a crucial task for the design of fiber links. Usually, time-consuming numerical simulations involving the NLSE are required to find optimal operating regimes and optimal system parameters. Comprehensive investigation of stable regimes and their tolerance in multi-dimensional parameter space is limited by the computational time required for optimizations.

Propagation of optical pulses through an optical fiber including both dispersive and nonlinear effects can be described using the nonlinear Schrödinger equation (NLSE)

$$i\frac{\partial E}{\partial z} + \frac{1}{2}\beta(z)\frac{\partial^2 e}{\partial t^2} + \sigma(z)|E|^2 E = 0 \qquad \text{(Equation 1)}$$

where the first order GVD coefficient $\beta(z)$ in $ps^2/km$ is expressed in terms of the dispersion D (in ps/km/nm) as $$\beta(z) = -(\lambda_0^2 D/2\pi c) \qquad \text{(Equation 2)}$$

The term $|E^2|$ is the optical power P in watts and gives rise to the nonlinear optical Kerr effect where the nonlinear coefficient is given by $$\sigma(z) = 2\pi n_2/\lambda_o A_{eff} \qquad \text{(Equation 3)}$$

In these equations E is the complex wavefunction of an optical signal propagating in the communications link, $i=\sqrt{-1}$, $\lambda_o$, is the carrier wavelength of the optical signal, $n_2$ is the nonlinear refractive index of the fiber, c is the free space velocity of light, and $A_{eff}$ is the effective mode area of the fiber core.

One analytical solution to the NLSE is known as an optical soliton that has been shown to be feasible for long-haul optical communications. An optical soliton utilizes the opposing effects of CD and SPM within the optical fiber to enable a pulse to be propagated for many thousands of kilometers before requiring amplification. Soliton communication systems, however, have experienced a slow adoption rate due to the large cost required to convert currently installed communications equipment to be able to handle soliton transmissions. Therefore, optimization of fiber optic communications requires modeling of optical pulses with a more general structure, for instance, that of a standard traveling wave solution such as can be described as $$E = E_o \exp[i(\omega t - kz + \phi)] \quad \text{(Equation 4)}$$

with a frequency $\omega$, wavevector k, and initial phase $\phi$. For these cases the NSLE must be solved numerically for the communications link. One technique, known as the split-step Fourier method considers the individual actions of SPM and GVD, computing each as independent actions that accumulate as the pulse propagates through discrete segments of the optical fiber.

This numerical technique requires that the optical signal be transformed between the time- and frequency domains at each iteration to be able to compute the different effects. In this way, the phase information is inextricably linked to that of the GVD and the dispersion of the optical signal. As well as the multiple Fourier transforms required by the algorithm, the numerical technique also becomes excessive in terms of computation time due to:

The long distances of a communications link that must be completely characterized from transmitter to final receiver, and The small fiber length segments that must be used in order to gain an accurate representation of the optical signal as it propagates through the fiber.

Whilst the preferred embodiment does not eliminate the need for modeling of the communications link, it can reduce some of the tolerances of the models due to the reconfigurable nature of the compensation at each node. This is also useful as the optical properties change over time as this can be compensated for electronically from a central location simply by adjusting the level of compensation provided by the device. When a system is designed for use at one channel bit rate (e.g. 10 Gbit/s), the same system may be able to be used at a higher channel bit rate (e.g. 40 Gbit/s) by exploiting the increased margin that is provided in the preferred embodiment.

Group velocity delay (GVD) is defined as the change in phase $\phi$ of an optical signal as a function of frequency $\omega$.

$$T = \frac{\Delta \phi}{\Delta \omega} \Rightarrow \frac{d\phi}{d\omega} \quad \text{(Equation 5)}$$

Dispersion of optical signals is defined as the change of the GVD as a function of frequency:

$$D = \frac{\Delta T}{\Delta \omega} = \frac{\Delta}{\Delta \omega} \frac{\Delta \phi}{\Delta \omega} \Rightarrow \frac{d^2 \phi}{d\omega^2} \quad \text{(Equation 6)}$$

The dispersion can be positive or negative depending on the wavelength of the optical signals and the properties of the optical fiber. Thus, in a dispersion-managed communication link at any point, if the phase of an optical pulse is known then the GVD and dispersion of the optical signal can be determined for any particular wavelength channel of known frequency, or vice-versa, by using the NLSE. It is this property that defeats the dynamic compensation of the channels in the communications link at any point without first converting the optical signal to an electronic one and suffering the bandwidth restrictions that entails.

Compensation of Dispersion and GVD Effects

If each of the individual wavelength channels could be de-coupled from all the others in the optical domain the phase of each of the signals could then be modified independently. This can be realized using a dispersive element such as an optical grating or prism and has been demonstrated for beam steering applications by modification of the phase front of the channel perpendicularly to the dispersion axis.

An improvement on this system is the ability to modify the phase of the dispersed optical wavelength channel in the dispersion axis on a scale less than that of the frequency bandwidth of the channel itself. Since the phased-matrix wavelength processor is constructed from discrete individually controllable pixels this gives discrete electronic control over the light. The control can be further improved by angularly offsetting the phased-matrix processor slightly with respect to the dispersion axis. This gives the added advantage of smoothing the phase profile that the light incident on the pixels experiences. The angular offset needs only be very slight to achieve a significant smoothing effect of the discrete nature of the phase profile experienced by the light, typically on the order of the pixel width of the wavelength processor divided by half the width of the optical beam in the dispersion axis. In the current embodiments of the system this equates to a sub-degree offset approximately 0.3°.

Figure 1:
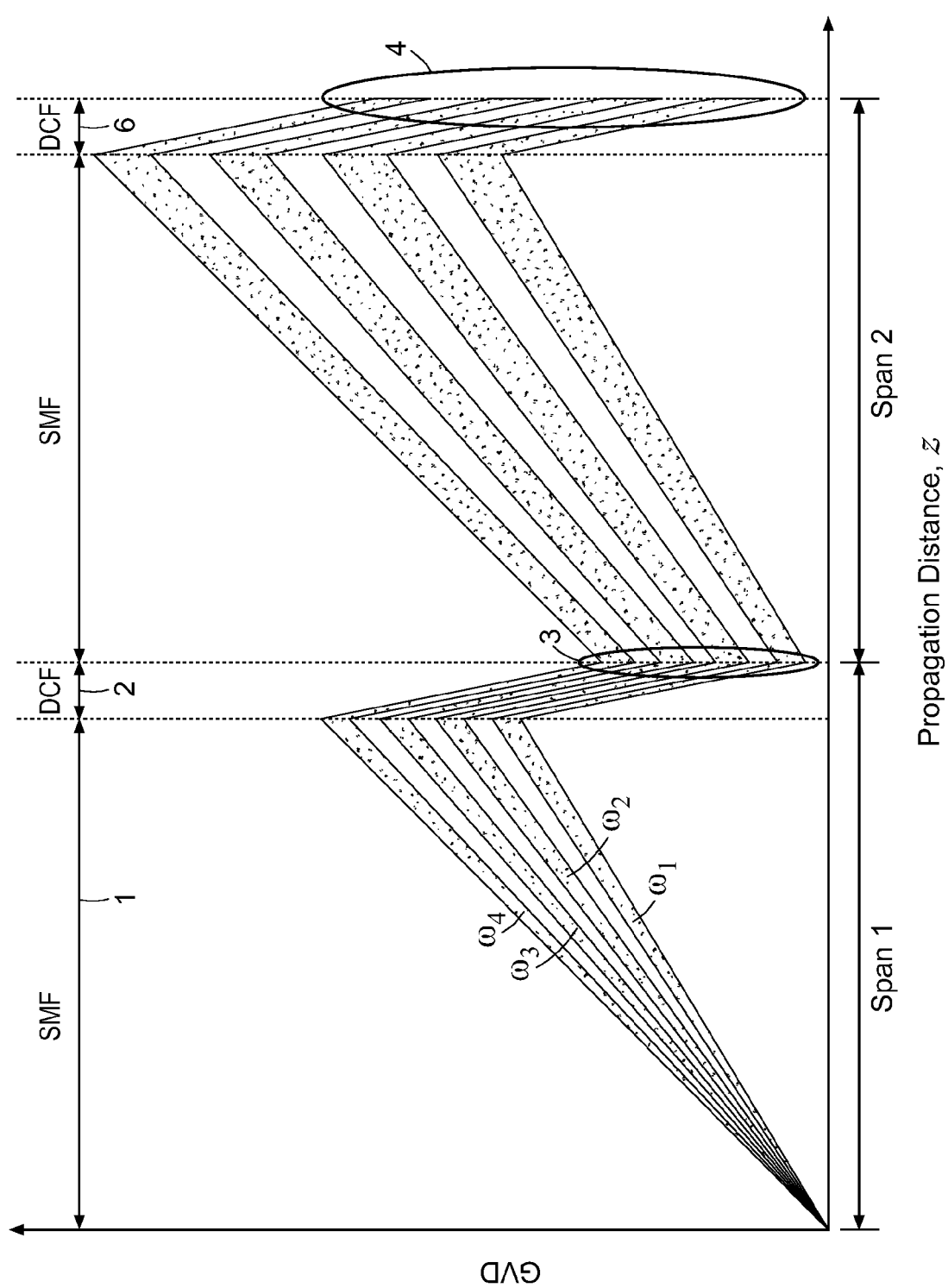
FIG. 1 is a graph depicting a prior art dispersion map of the group velocity delay of a plurality of optical channels in a DWDM telecommunications link.
Figure 2:
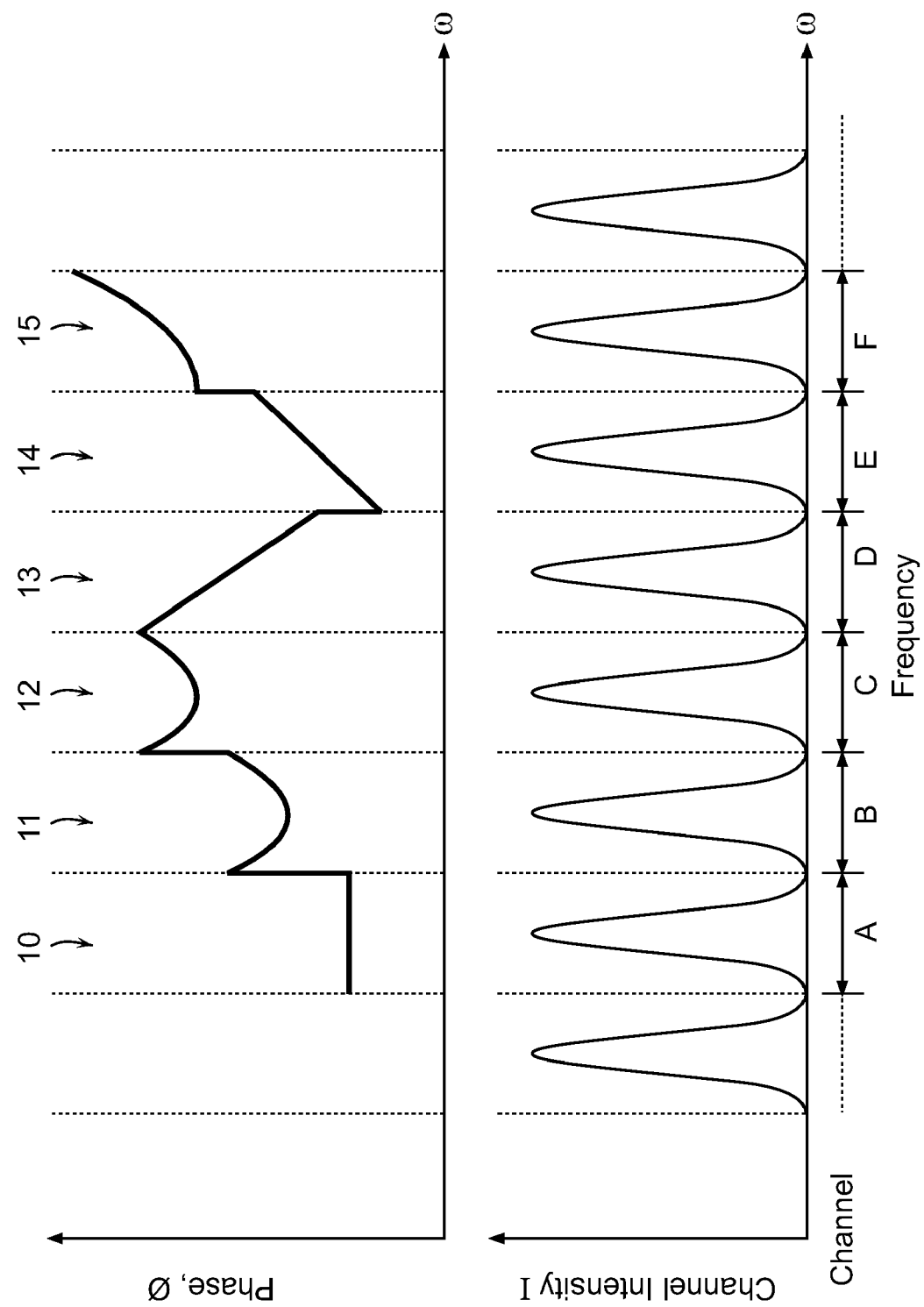
FIG. 2 shows the optical intensity of a plurality of wavelength channels incident on discrete regions of a wavelength processing device where each individual channel receives a predetermined compensating phase profile across the spectral width of the channel.

FIG. 2 shows an example phase map as a function of frequency increments for a number of optical channels in a DWDM communications system where the phase of each of the channels incident on an optical phased-matrix processor is modified in a dynamic fashion. Channel A (10) experiences a uniform phase shift across the bandwidth of the channel by an arbitrary amount by the phased-matrix processor. When Channel A leaves the device, it still retains the CD that it has accumulated in traveling through the optical fiber span before reaching the processor. In contrast, the adjacent Channel B (11) experiences a parabolic phase shift across the bandwidth of the channel to compensate for the effect of CD in the previous span. The parabolic nature of the modulation across the channel in the frequency domain is selected based upon the quadratic nature of the dispersion as can be seen on inspection of Equation 6. Channel C (12) experiences the same amount of CD compensation as Channel B, but also experiences an additional linear phase shift. Channels D and E (13 and 14 respectively) experience respectively a negative and positive group velocity delay across the channel in analogy with Equation 5 but since there is no quadratic component to the induced phase profile, no CD compensation occurs on these Channels. Channel F (15) experiences both a positive group delay and CD compensation.

As can be seen from FIG. 2, each of the optical channels within the communication link has been de-coupled from the other channels which therefore allow the phase as a function of frequency across the channel to be modified independently.

This is achieved by first dispersing the channels and directing them to be incident on an electronically controllable phased-matrix processor.

A typical optical communications system is shown schematically in FIG. 3. A plurality of unique DWDM optical signals is generated by a transmitter 20 into standard SMF 21 (generally leaf fiber with a dispersion coefficient of between 16-20 ps/nm.km). A length of DCF 22 is connected to the SMF after a predetermined length to compensate for the majority of the accumulated GVD across the channels. The combination of the SMF and DCF are generally considered as a single span. After the length of DCF the signals enter a node 23 where the signals are typically only amplified by a length of EDFA 24. Some optical communications links convert the optical signals to electronic signals within the node for further signal processing as required. The signals are then re-transmitted into a second length of SMF and the configuration repeats until the signals are collected at a receiver 32. The signals are then typically converted to electronic signals for correction of residual GVD, dispersion and nonlinear effects and routed to either to their final destination or reconverted to optical signals for re-transmission on a subsequent communications link.

In the preferred embodiment of the current invention, a further optical wavelength processing device 28 as shown in FIG. 4 is inserted into the node. In further embodiments of the invention as shown in FIG. 5, the optical processing device 29 can also include capabilities of a reconfigurable optical add-drop multiplexer (ROADM) similar to that disclosed in the related U.S. patent application Ser. No. 10/868,521 to Frisken. In this embodiment, the optical processing device includes a plurality of add ports 30 and a plurality of drop ports 31. Particular wavelength channels can be extracted from the primary transmission link to be re-routed via the drop ports and other wavelength channels can be added to the communications link via the add ports.

Figure 6:
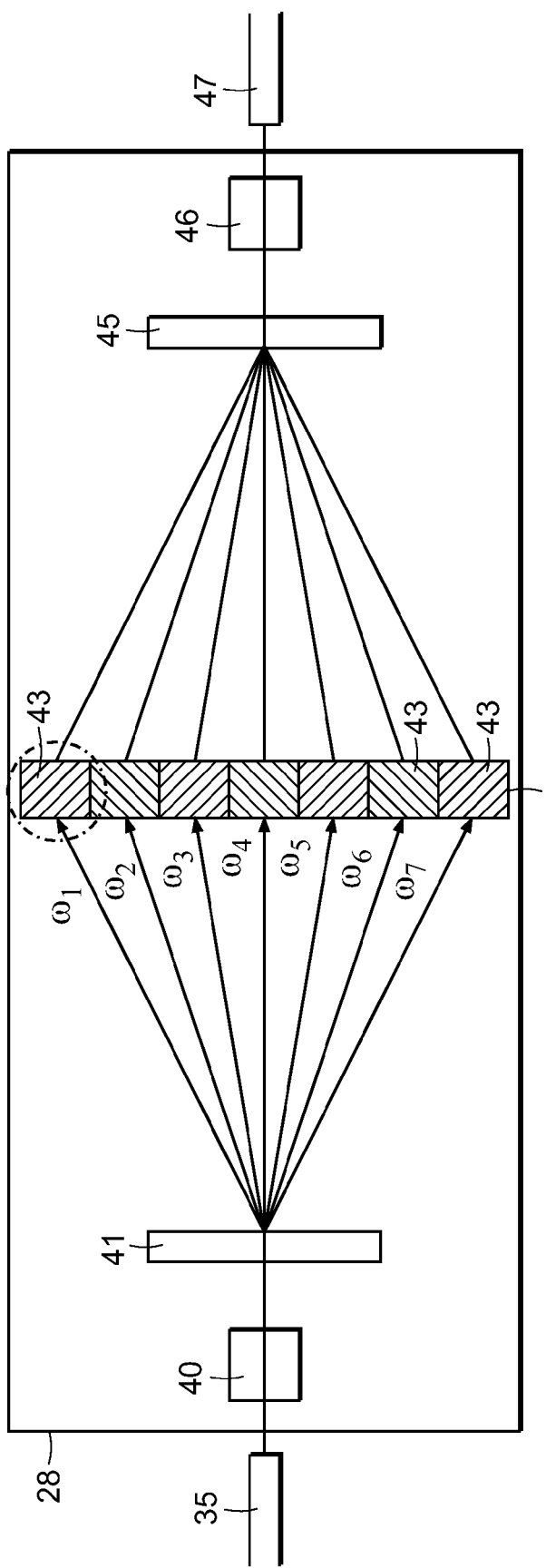
FIG. 6 is a schematic diagram of the optical processing device of the preferred embodiment of the invention.

A schematic diagram of the optical wavelength processing device is shown in FIG. 6. The DWDM signals enter the device on an optical fiber 35 and enter a series of conditioning optics 40. In the preferred embodiment, the conditioning optics includes a lens aligned with the input port 35 to decrease the numerical aperture (NA) of the optical fiber. This relaxes the requirements on the optical quality of the subsequent optical elements. In the ROADM embodiment, the single lens becomes an array of lenses each aligned with a corresponding input port, either the main input port 35 (also known as the express port) or one of the add ports 30.

The conditioning optics 40 also includes polarization manipulation and equalization elements to substantially place all the light emerging from one of the inputs in a single polarization orientation for efficient processing of the signals by the subsequent optical elements that are usually polarization sensitive. The polarization manipulation and equalization elements can include composite $\lambda/2$ waveplates and or birefringent wedge (BRW) elements such as those disclosed in U.S. patent application Ser. No. 10/868,521 to Frisken.

The optical signals are then transmitted through free space to an optical diffraction element 41 such as an optical grating, prism or grism available from for example Newport, Spectra Physics or a multitude of alternate optics suppliers, where the propagation direction of the individual wavelength channels are slightly angularly separated with respect to each other such that after a predetermined distance the signals are each wholly spatially separated. Each of the optical signals is characterized by a pre-defined spectral width $\Delta\omega$ that is set for the public networks by the International Telecommunications Union (ITU) with channel spacings ranging between 200 GHz and 12.5 GHz.

The spatially separated optical signals are then incident onto a phased-matrix optical processor 42 that is placed at the predetermined distance away from the diffraction element 41. The optical processor is a two-dimensional array of individually addressable pixel elements 44 that operate on the phase of the incident optical signal. An example of a suitable processing device is that of a liquid crystal array commonly used for display and projection applications and available from a variety of sources such as MicroDisplay of San Pablo Calif., USA.

The individual wavelength channels are redirected to a second optical diffraction element 45 to be recombined. A second series of optical conditioning element 46 focuses the recombined DWDM channels into an optical output fiber port 47, which, in the preferred embodiments of the optical communications system, is the SMF stage (25 of FIG. 3) of the subsequent span in the communications link.

FIG. 6 of the phased-matrix optical processor is depicted in a transmissive mode. The phased-matrix optical processor can also be operated in a reflective mode where, in this case the optical diffraction elements 41 and 45 are the same element, and the optical conditioning elements 40 and 46 are also the same elements. This reflective configuration is preferred since it reduces the complexity and improves the manufacturability of the optical processing device.

Figure 7:
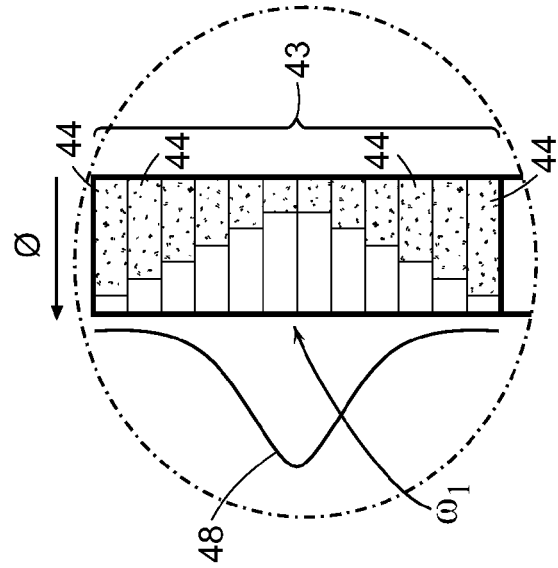
FIG. 7 is a detail of a region of the phased-matrix processor of the preferred embodiment and an arbitrary phase profile set up in the pixels of the region to modify the phase of an incoming wavelength channel.
Figure 8:
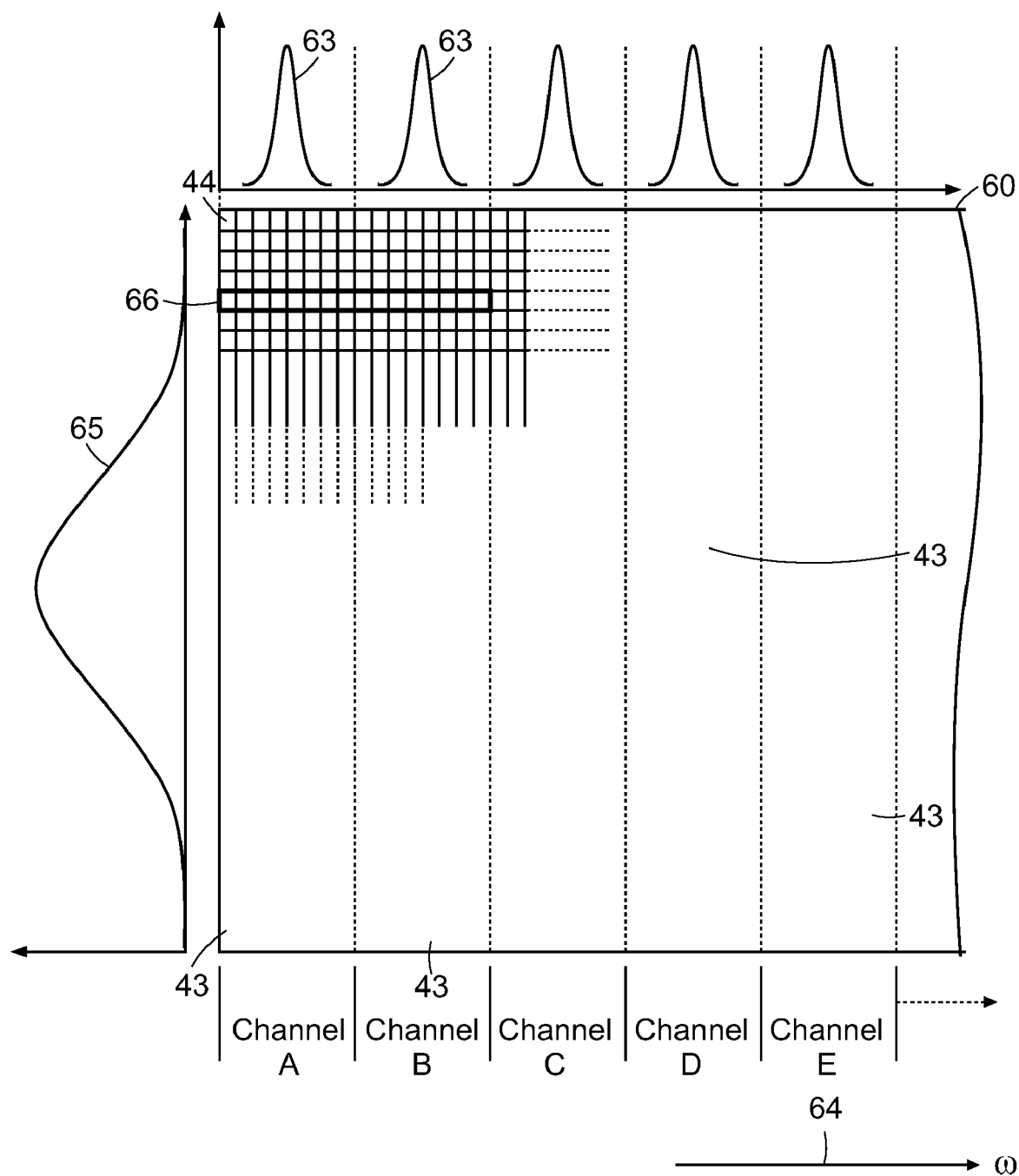
FIG. 8 is a schematic top view of the phased-matrix processor showing the pixels of the device and the segmentation of the device into regions, each region for modifying a spatially separated wavelength channel. Also displayed in this figure are the typical intensity profiles of the wavelength channels in each orthogonal plane in the preferred embodiment of the system.

The phased-matrix optical processor is divided into a plurality of regions in the same plane as the optical diffraction element such that each of the wavelength channels is incident on one of the regions as shown in FIG. 7, in this case the wavelength channel $\omega_1$ is shown striking the region 43 with an intensity profile 48. FIG. 8 shows schematically a phased-matrix optical processor 60 that has individually addressable pixels 44 on its surface. Each of the wavelength channels is incident on a region 43 of the phased-matrix optical processor with an intensity distribution 63 in the dispersion axis (axis indicated by arrow 64). In the preferred embodiment, the regions each include approximately 10 to 12 pixels in the dispersion axis and approximately 500 pixels in the orthogonal axis. In other embodiments the number of pixels in either axis can be increased to give greater resolution and hence finer control of the phase of the channel as required. The intensity distribution 65 of each of the channels in the orthogonal axis is also shown. The pixels 44 are each driven to one of a number of levels to modify the phase of the light that is incident on that pixel. Each of the regions includes a plurality of pixels 44 in the diffraction plane such that the phase of the individual channels can be modified as a function of the frequency of the light. Each of the individual pixels within the spectral width of the individual channel, i.e. occurring with the corresponding region 43, can be electronically controlled to give a desired amount of phase shift to the optical signal.

The profile of the phase modulation across the channel in the frequency axis can be configured to compensate for propagation effects of the preceding optical fiber span such as CD and GVD mismatch between channels. Modification of the pixel levels along the axis orthogonal to the diffraction axis can be used for switching applications for example in an ROADM where the channels can be individually directed to another optical fiber, as in a drop port. An example of this functionality is seen in U.S. patent application Ser. Nos. 10/706,901 and 10/868,521 to Frisken.

Figure 9:
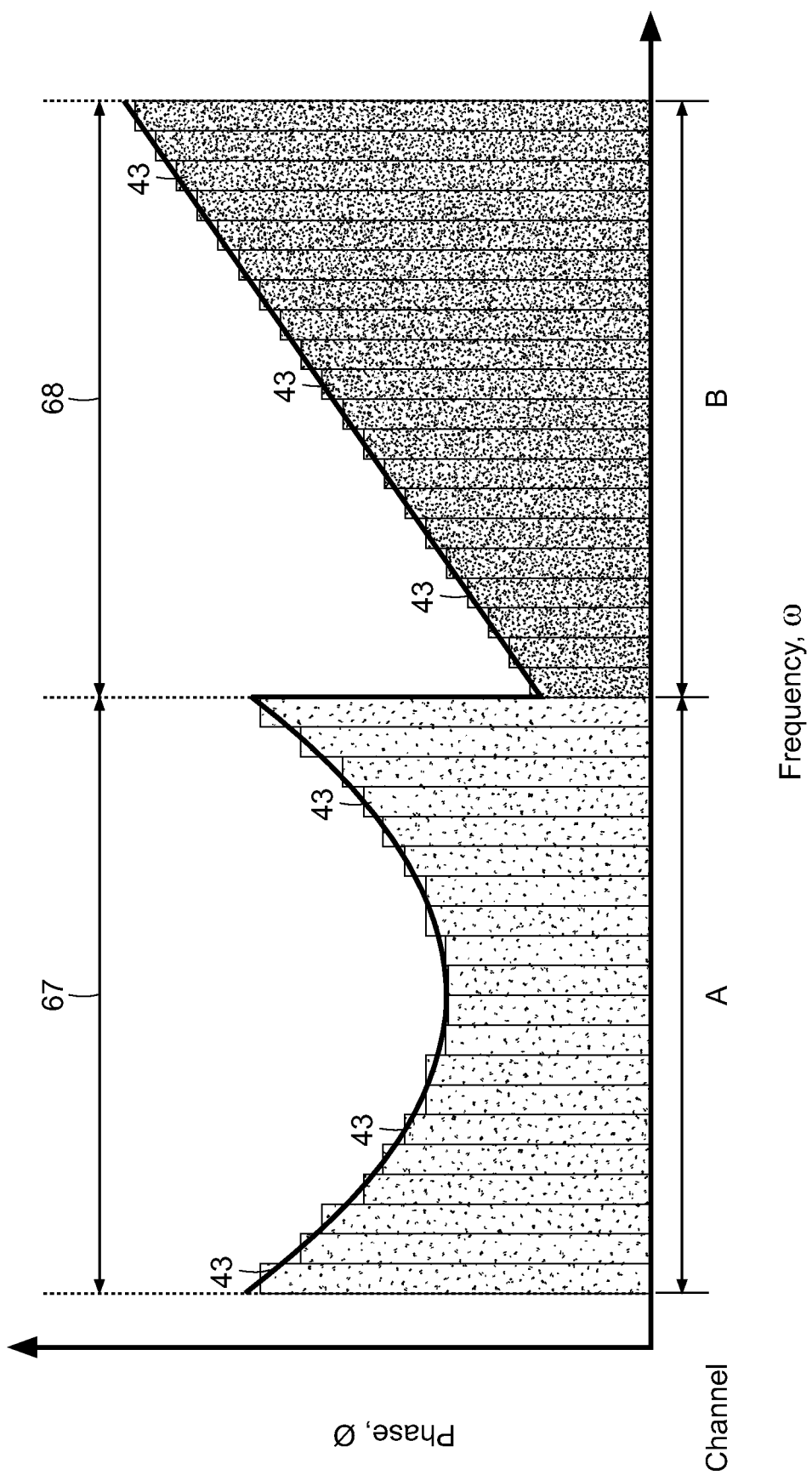
FIG. 9 is a graph of arbitrary phase profiles that can be set up in the pixels of the phased-matrix processor across two regions of the processor corresponding to two adjacent wavelength channels.

FIG. 9 shows a graph of driving levels of the individual pixels 44 of the optical phased-matrix processor across two wavelength channels in the frequency axis (pixels 66 of FIG. 8). In the first region 67 of the phased-matrix optical processor the pixels are configured along the frequency axis (also known as the dispersion axis of the processor) to provide a controlled amount of CD compensation to the optical wavelength channel (Channel A) incident on this region. The parabolic nature of the phase profile across the channel is determined by the relationship between the optical phase and the dispersion as defined in Equation 6. The adjacent region 68, which is selected to operate on the next adjacent wavelength channel (Channel B) in the DWDM signal, has been separately configure to only compensate for a predetermined amount of GVD accumulated by the incident wavelength channel. The linear phase profile with respect to frequency across the channel is determined by the relationship between the optical phase and GCD as defined in Equation 5.

Additionally, amplitude control of the individual optical channels can be obtained by setting up a phase ramp in the axis orthogonal to the dispersion axis. This type of phase profile can be used to direct a predetermined percentage of each individual channel to a predetermined output port by suitable selection of the phase profile to create a diffractive phase grating that directs the required amount of light into a particular grating order. This technique can be used as an all optical reconfigurable ROADM similar to that disclosed in U.S. patent application Ser. No. 10/706,901 to Frisken. This phase ramp is typically reset each time the effective phase imparted to the light reaches $2\pi$. This method can be used to impart an arbitrary phase shift to the signal simply by adjusting the position of the reset point.

Figure 10:
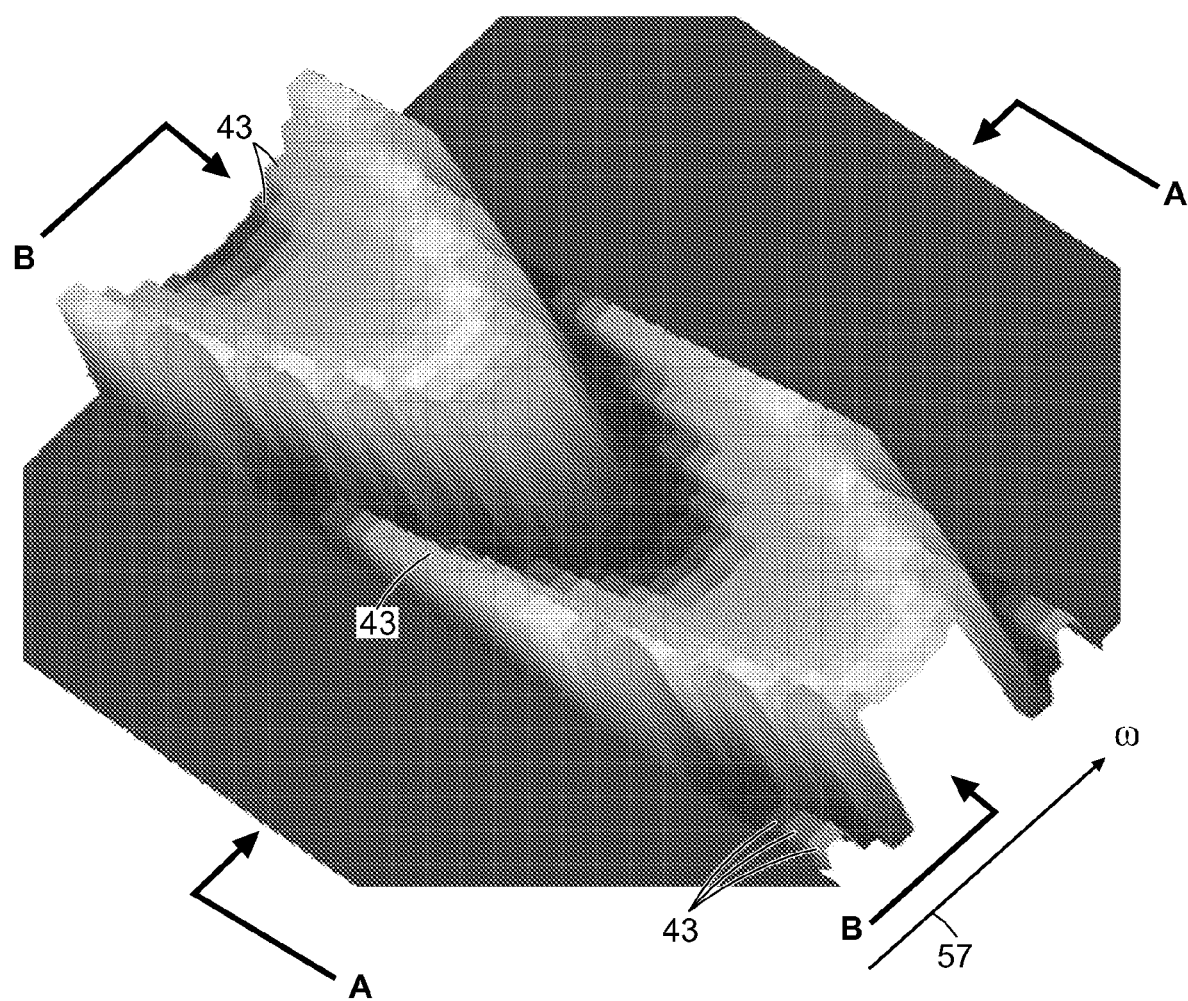
FIG. 10 is a three-dimensional representation of an arbitrary phase profile set up on a liquid crystal optical wavelength processor for a single wavelength channel.
Figure 12:
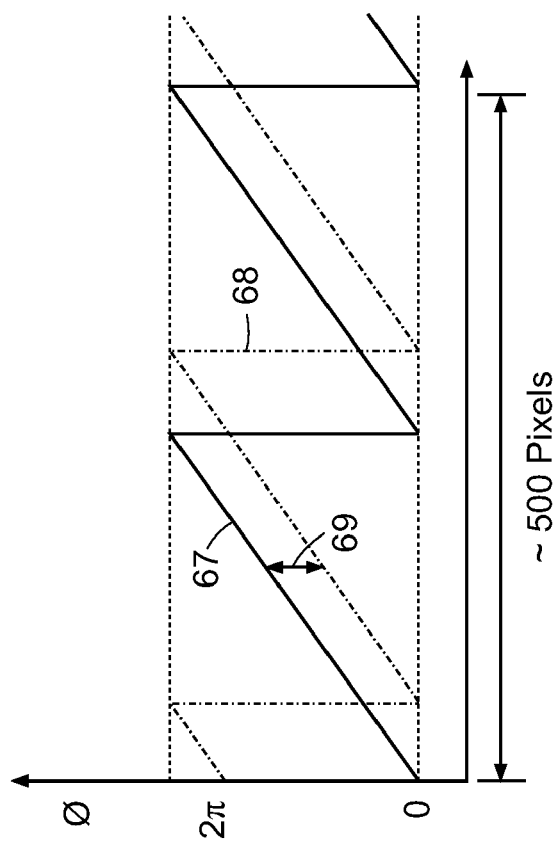
FIG. 12 is a section of the phase profile taken on line B-B of FIG. 10.
Figure 11:
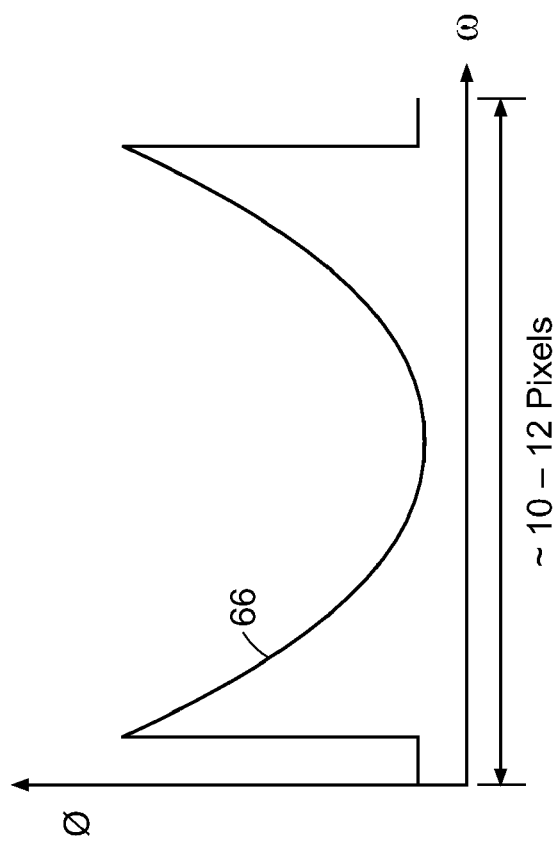
FIG. 11 is a section of the phase profile in the dispersion axis taken on line A-A of FIG. 10.

FIG. 10 shows a three-dimensional representation of an arbitrary phase profile set up on a liquid crystal optical wavelength processor for a single wavelength channel. The height of the individual pixels 43 indicates the amount of phase change that it imparted to the light incident on that pixel. The phase profile in the dispersion axis 57, as taken on line A-A is a quadratic profile 66 as shown in FIG. 11. In the orthogonal plane of the wavelength processor, the phase profile, as taken on line B-B of FIG. 10 is a $2\pi$ repeating ramp 67 as shown in FIG. 12. Also depicted in FIG. 12 is a second phase ramp 68 indicating how an arbitrary phase shift 69 can be imparted to the light incident on the optical wavelength processor simply by adjusting the pixel where the reset point occurs.

Note that in the preferred embodiment, the optical signals are not converted into electronic signals but remain in the optical domain. This eliminates the complexity of the system by having separate electronic devices dedicated to each channel. By keeping the signals in the optical domain also increases the capacity of the communications link such that it is able to with higher bit rate communications signals demanded by next-generation optical networks. The optical processor itself though is electronically controllable and so lends itself to active reconfiguration of the compensation as the needs of the optical transmission link change from span to span and over time as various elements in the link degrade.

Compensation of Nonlinear Effects

Optical fibers are capable of supporting a range of nonlinear effects that usually result in the generation of new wavelengths. In DWDM communications systems the most common nonlinear process that affects the OSNR of the optical channels involves the mixing between signals of two or more wavelengths through the optical Kerr effect. Nonlinear processes can also cause a modification of the phase structure of the optical pulses propagating in the nonlinear medium. The magnitudes of these effects are dependent on the strength of the incident field raised to some power. The SPM effect is another example of a nonlinear process but, as described earlier, does not usually affect the integrity of the ONSR of the signal since it is an interaction of a pulse with itself.

Nonlinear processes are typically weak, however, in optical fibers the small mode-field cross-section in SMF results in high field strengths, even if the total power carried by the fiber is relatively small. For this reason, optical nonlinear processes must be seriously considered and understood when designing an optical fiber communications link.

The most problematic nonlinear process in optical fibers is four-wave mixing (FWM) which is a third-order nonlinear process where the interaction of three fields leads to the generation of a fourth. A general explanation of the process involves light at two different frequencies which interact with the bound electrons in the optical fiber to modulate the refractive index at the difference frequency of the signals. The light is then modulated as it encounters the index modulation and is up- or down-shifted by the difference frequency resulting in the generation of sidebands to the original optical signals.

FWM is governed by the phase-matching condition $\omega_1+\omega_2=\omega_3+\omega_4$ which is relatively easy to satisfy in optical fibers for the degenerate case of $\omega_1=\omega_2$. In this case a strong signal at frequency $\omega_1$ interacts with a third signal at a frequency $\omega_3=\omega_1-\Delta\omega$ to creates a fourth signal located symmetrically about $\omega_1$ at a frequency $\omega_4=\omega_1+\Delta\omega$. In DWDM systems containing multiple channels each separated by a frequency of $\Delta\omega$, the FWM process is effectively seeded at each frequency by the adjacent optical channels. That is, the n-th optical channel at frequency $\omega_n$ interacts with itself and with the adjacent channel $\omega_{(n-1)}$ which is spaced from $\omega_n$ by $\Delta\omega$. This creates a new signal at frequency $\omega_n+\Delta\omega$ by the FWM process which occurs at a frequency of $\omega_n+\Delta\omega=\omega_{(n+1)}$. That is, the FWM-product manifests itself as a noise term at the frequency of the next adjacent channel which degrades the OSNR of the optical signal at that that frequency. The newly generated signals contain the phase information of the pump wavelengths which also makes this process an important cross-talk mechanism in DWDM communications systems, particularly those that rely on the phase information of the transmitted pulse.

FWM is the main nonlinear effect that contributes to the degradation of the optical signal. The new frequencies generated by the process cause cross terms between two wavelength channels, which in turn degrades the OSNR of each wavelength channel. Cross-phase modulation (XPM) is effectively a by-product of FWM within the fiber. Another way to think about XPM it that it occurs between two pulses traveling in the fiber of frequencies $\omega_1$ and $\omega_2$. An optical beat is generated by the two pulses at the difference frequency $(\omega_2-\omega_1)$. This beat modulates the pulse and generates by the FWM process a noise term at $\omega_3=2\omega_2+\omega_1$. It is this noise term at $\omega_3$ that degrades the OSNR of the next adjacent wavelength channel since it occurs at the same frequency. FWM interactions are strongest between two adjacent wavelength channels since the difference in frequency $\Delta\omega$ is small which results in a long coherence length in which the channels can interact. The coherence length $L_{COH}$ is defined as:

$$L_{COH} = \frac{2\pi}{|\Delta\phi|} \propto \frac{1}{\Delta\omega^2} \qquad \text{(Equation 7)}$$

where significant FWM occurs for lengths of fiber in the region $L<L_{COH}$ and can effectively be thought of as the distance that the channels remain in-phase as they propagate through the fiber. The FWM interactions are thus strongest between two adjacent wavelength channels since the difference in frequency $\Delta\omega$ is small.

A less significant, but still important, feature intertwined with the FWM effect is the GVD of pulses of different frequencies which propagate at different speeds through the fiber. The GVD difference between two channels of interest is known as the GVD mismatch. This feature leads to a walk-off effect in the description of nonlinear phenomena involving two or more pulses which overlap in the time domain. More specifically, the nonlinear interaction between two optical pulses ceases to occur once the faster moving pulse has completely walked through the slower moving one. The separation between the two pulses is described by a walk-off parameter $d_{12}$ defined by $$d_{12} = \frac{1}{v_g(\omega_1)} - \frac{1}{v_g(\omega_2)} \quad \text{(Equation 8)}$$

where $v_g(\omega_1)$ is the group velocity of the optical pulse of frequency $\omega_1$. For pulses of width T, the walk-off length can be defined as:

$$L_W = \frac{T}{|d_{12}|} \quad \text{(Equation 9)}$$

The FWM of optical signals is also dependent on the phase of the interacting optical signals as seen from the dependence on the form of the propagating wave. The effect is strongest when the pulses are in-phase. Thus, two pulses of frequencies $\omega_1$ and $\omega_2$ overlapping in time at the beginning of a span in the link, where the coherence between the pulses is also greatest, will experience the greatest nonlinear coupling. The nonlinear effects accumulate as the pulses propagate through the fiber since the relative phase of neighboring channels is maintained over long distances. The effect on the pulses as they propagate through the fiber is governed by the " . . . $+\sigma(z)$ $|E|^2E$ . . ." term of the NLSE (Equation 1), where E is form of the propagating wave is defined in Equation 4.

Current methods of compensating for these nonlinear effects are mainly focused towards minimization of the effects rather than compensation. This is usually achieved through management of the dispersion map and the individual fiber lengths that make up the transmission link. Common dispersion managed links benefit slightly by the GVD mismatch that occurs between adjacent channels since the pulses at the beginning of the next span are not completely overlapping, however, there is still a residual amount of coupling that acts to degrade the OSNR across the entire length of the link.

A better solution is to manipulate the optical signals in such a way that the optical pulses propagating in the link self-compensate for the accumulated nonlinear build-up. This can be accomplished by manipulating the phase relationship of the interacting optical signals. Two optical signals that are in-phase interact to generate additional signals through the FWM interaction. The distance over which this interaction occurs is governed by the walk-off distance $L_w$ defined in Equation 9. That is, the nonlinear interaction is strongest in a positive sense when the pulses involved are completely overlapping and in-phase, and the interaction strength decreases as the overlap decreases and the pulses undergo a de-phasing with respect to each other as a result of normal propagation.

Figure 13:
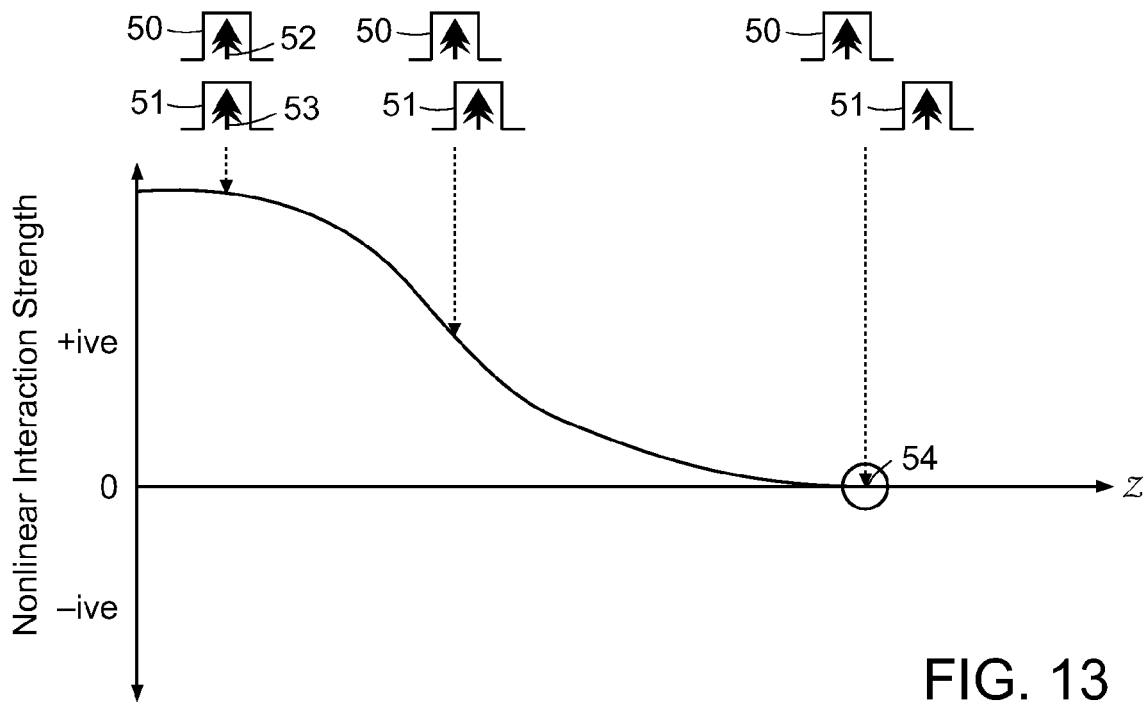
FIG. 13 is a graph showing the nonlinear FWM interaction strength between two in-phase pulses of different frequency as they propagate through a length of standard SMF.

The FWM process possesses a reciprocal nature in that, when the two interacting pulses are completely out-of-phase, the interaction is equally strong but in a negative sense. This can be seen more clearly in FIGS. 13 and 14. FIG. 13 shows a graph of the nonlinear interaction strength as a function of propagation distance z along one span of SMF in the communications link. Also depicted in this Figure are pictorial representations of two arbitrary signal pulses 50 and 51 of different frequencies at various distances along the span. At the start of the fiber (z=0) the two pulses are completely overlapping and are in-phase (depicted by arrows 52 and 53) such that the nonlinear interaction strength is a maximum in a positive sense. As the pulses propagate along the fiber, the overlap between the two pulses decreases due to the difference in the group velocity such that the interaction strength decreases to zero (54) when the pulses have completely walked apart.

Figure 14:
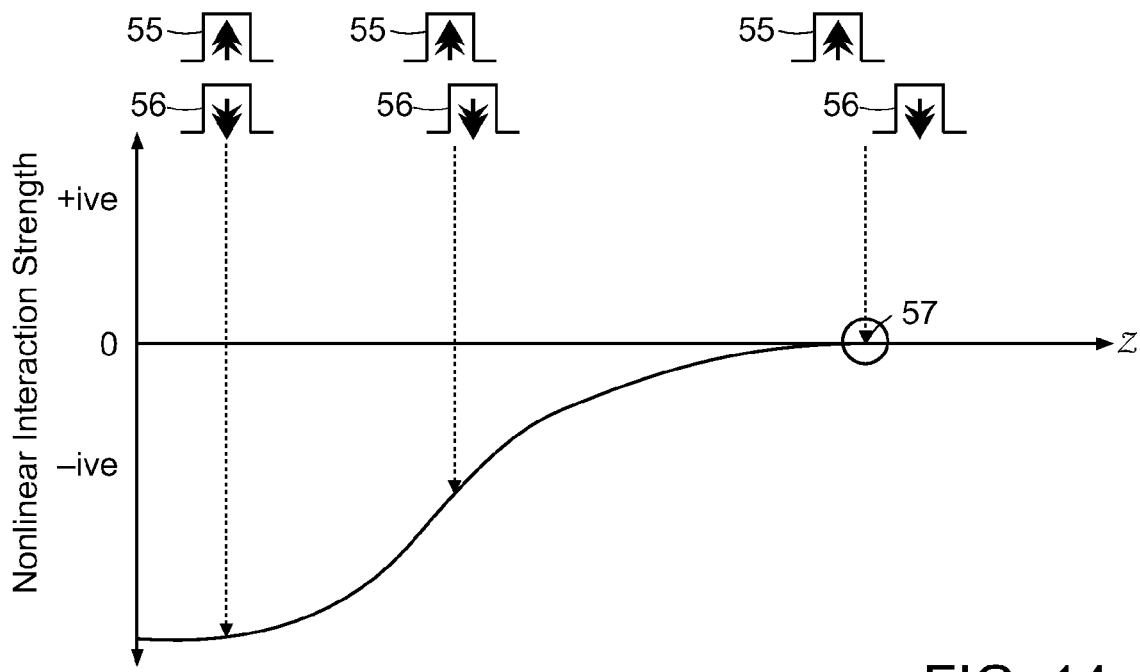
FIG. 14 is a graph showing the nonlinear FWM interaction strength between two out-of-phase pulses of different frequency as they propagate through a length of standard SMF.

FIG. 14 shows a similar graph to that of FIG. 13, however, it depicts the interaction between two different optical pulses 55 and 56, again of different frequency, however in this case the relative phase of the two pulses is 180° or $\pi$ radians i.e. the pulses are out-of-phase. In this case, the nonlinear interaction is again initially at a maximum when the pulses are overlapping at the beginning of the span, however, the sign of the interaction is negative. Again, as the pulses walk apart due to GVD, the interaction strength decreases to zero as shown at point 57.

Figure 15:
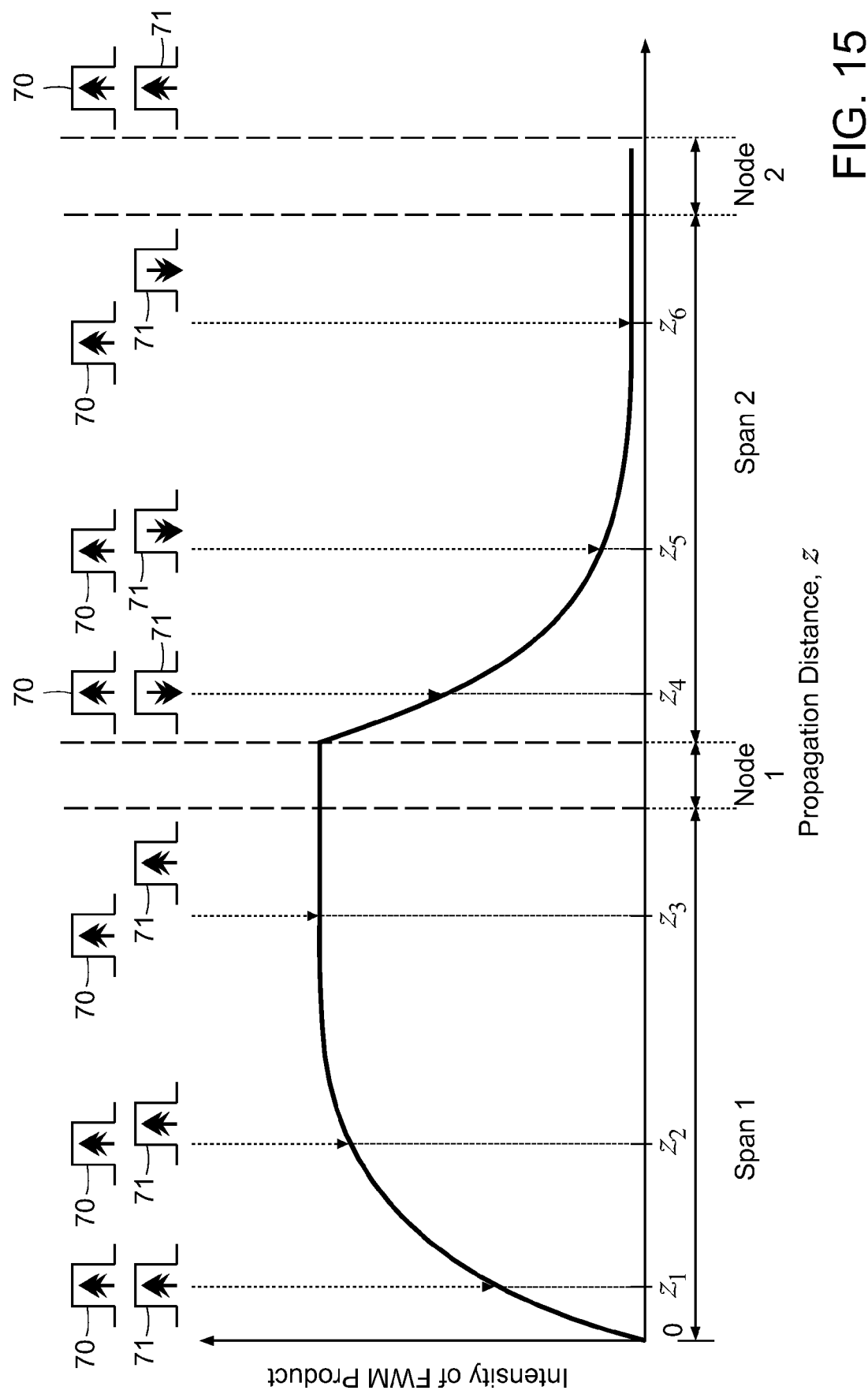
FIG. 15 is a graph of the intensity of the FWM product between two pulses of different frequency as they propagate through two spans of a telecommunication link in accordance with preferred embodiments of the invention.

This reciprocality in the nonlinear interaction can be exploited is seen in FIG. 15. This Figure is a graph depicting the intensity of the FWM products between two optical pulses over two spans of an optical fiber link. An amplifier/compensation node is included at the end of each span (Node 1 and Node 2). At the start of the link ($z=z_1$) two pulses 70 and 71 of different frequencies are overlapping in in-phase. The nonlinear interaction strength is thus at a maximum between the pulses and the intensity of the FWM product is increasing at a rapid rate. As the pulses propagate along the fiber in the z-direction they walk apart ($z=z_2$) so that the interaction strength decreases and the rate the intensity of the FWM product builds up decreases. When the pulses have completely walked apart ($z=z_3$), the intensity of the FWM product had reached a maximum level and does not increase any further along the span.

At the first amplifier/compensation node (Node 1) there is installed an EDFA to compensate for signal amplitude distortion and an optical wavelength processor as described previously. The optical processor compensates the GVD and dispersion that the pulses have experienced on propagation through the first span which bring the two pulses back to their initial relative relationship in time. In this case the two pulses are brought back into an overlapping relationship where the magnitude of the nonlinear interaction is a maximum (at point $z=z_4$). Additionally, the optical processor also imparts an additional phase shift of $\pi$-radians to one pulse relative to the other (in a similar fashion to that described earlier and depicted between Channels A and B of FIG. 2). This ensures that the two pulses are now completely out-of-phase such that the sign of the nonlinear interaction is negative. Now, as the pulses propagate, the FWM products which were generated in the first span are effectively unwound due to the reciprocal nature of the FWM process. Thus, as can be seen in FIG. 15, as the pulses propagate through Span 2 of the optical link the intensity of the FWM products initially generated in Span 1 decreases with a rate proportional to the amount of overlap between the pulses in other words, the nonlinearity is unwound such that, at the end of the second span, the intensity of the FWM products of the two pulses is substantially zero again.

As mentioned previously, typical prior art dispersion managed optical communications links are most effective when the optical signals travel the entire length of the managed link so that they attain the full benefit of the compensating stages. In reconfigurable optical links where signals are being added and drop at various points along the link, the signals are not receiving the benefit of the compensating stages and so the accumulated nonlinear effects can be quite varied. A method of improving this situation uses the active reconfigurable nature of the preferred embodiments of the current invention to minimize this nonlinear build-up. By using the above-described method where the nonlinearities are unwound between adjacent channels over two spans, the worst-case scenario of a signal is added to the link with respect to the accumulated nonlinearity would be that acquired over only two spans.

In one technique, every pair of two adjacent channels (for example channels 1 and 2, 3 and 4, 5 and 6 etc) can be treated in an isolated fashion so that the FWM products between the two channels do not build up. That is, at Node 1 after the first span (and every second node after that) the CD in the channels is completely compensated and the GVD mismatch between the pairs of adjacent channel is returned to substantially zero. Every second channel (i.e. channels 2, 4, 6, etc) also receives an additional phase shift of □ radians to put the channel out of phase with its adjacent channel. This allows the nonlinearities between the channels to unwind during propagation through the next span in a similar fashion to that described in FIG. 15.

This technique is effective for this first set of channel pairs (i.e. channels 1 and 2, 3 and 4 etc.), however, it does not take into account the nonlinear FWM effects that accumulate between channels 2 and 3 (and 4 and 5, 6 and 7 etc). A technique of minimizing this is to perform a similar operation at each subsequent node i.e. Nodes 2, 4, 6, etc., however, instead of compensating the GVD of channels 1 and 2, the relative GVD between channels 2 and 3 is substantially returned to zero at these nodes.

Monitoring of the GVD can be advantageous for periodic polling of the system to check the calibration factors as the system ages and is exposed to temperature variation which cause drift in the properties of the optical fiber components. This may be achieved by extracting the clock signal from each of the wavelength channels and comparing the phase of the received clock with its previous values and against the clock signals of the other channels.

Figure 16:
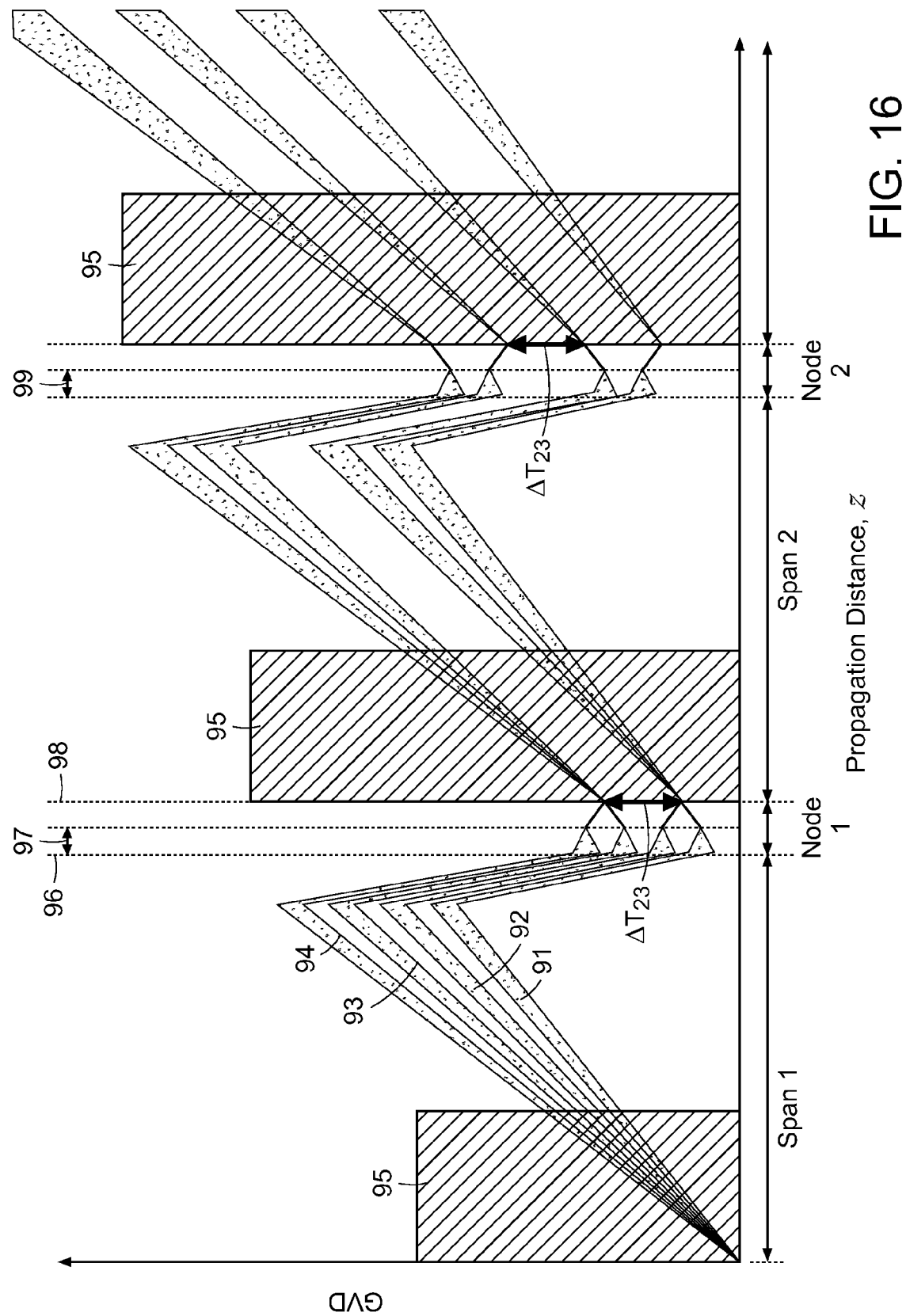
FIG. 16 is graph depicting a dispersion map of the group velocity delay of a plurality of optical channels in a DWDM telecommunications link with preferred embodiments of the invention.

This method is illustrated more clearly in FIG. 16 which shows a graph of the GVD for four optical channels $\omega_1$ to $\omega_4$ (91 to 94 respectively). The shaded regions 95 indicate the region along each span where the FWM nonlinear interaction is strongest. Each of the channels is initially considered to have a relative GVD of zero (i.e. $\Delta T=0$) and no CD.

Each of the channels experiences CD and GVD in the SMF of the span that is partially compensated by the subsequent length of DCF in the normal fashion. At the end of Span 1 (96) the channels have retained a certain amount of CD (depicted by the width of the channel in the vertical axis of the graph) and a GVD mismatch. After the amplification stage in the first Node (not indicated) the signals are fed into the preferred embodiment of the optical processor of the current invention. The CD is first compensated (indicated by region 97) and the clock signals GVD between the pairs of channels ($\omega_1$ and $\omega_2$) and ($\omega_3$ and $\omega_4$) is returned to its initial value of $\Delta T=\Delta T_{12}=\Delta T_{34}=0$ at the end of Node 1 (98). In addition to the GVD correction between adjacent pairs of channels, each second channel (i.e. Channels 2 and 4) each receive a phase shift of $\pi$-radians so that the nonlinear effects accumulated in Span 1 are unwound during propagation through Span 2 since the relative GVD between the channel pairs in Span 2 remains substantially equivalent to the relative GVD during propagation through Span 1. The GVD between channels 2 and 3 ($\Delta T_{23}$) which at this point is equal to twice the residual GVD is not adjusted at this stage.

At Node 2 the CD of each of the channels is again compensated (depicted by region 99), however, in this case the GVD mismatch between Channels 2 and 3 is adjusted to be equal to it's value at Node 1. One of these channels (say Channel 3) also receives an additional phase shift of $\pi$-radians so that the nonlinear effects that have accumulated between these two channels during propagation through Spans 1 and 2 begins to unwind as the channels propagate through the next span.

At each node in the transmission link, the CD and GVD can be actively reconfigured to take account of the particular fibers and the transmission lengths of the previous span. Initial testing with a first generation model of the preferred embodiment has been shown to provide greater than ±100 ps/nm across a channel of about 60 GHz in width. For a channel width of 30 GHz, the amount of CD compensation has been shown to be greater the 500 ps/nm. In conjunction with existing passive CD compensators, this amount of adjustable compensation is more than sufficient to cope with next generation optical networks operating at 40 Gbit/s. These limits have been determined for the current embodiment and are a result of choices made for the amount of dispersion compensation and the numerical aperture of the beam. Further optimization of the system parameters is possible to improve the amount of achievable compensation.

The independent control of phase and intensity at each network node offered by the preferred embodiments of the current invention opens up a vast array of potential system-level applications such as:

CD compensation, trimming and tailoring on a per-channel basis.

Suppression of nonlinear transmission effects such as FWM, group delay, and phase compensation.

Custom tailored optical filtering to maximize system OSNR.

Phase to amplification conversion for example as a phase-shift-keyed (PSK) receiver.

Seamless adding and dropping of wavelength channels including reconfiguration of the network architecture and multiple transmission standards (for example 10 Gbit/s and 40 Gbit/s) within a single device.

The optical communications system and methods described herein, and/or shown in the drawings, are presented by way of example only and are not limiting as to the scope of the invention. Unless otherwise specifically stated, individual aspects and components of the optical communications system and methods may be modified, or may have been substituted therefore known equivalents, or as yet unknown substitutes such as may be developed in the future or such as may be found to be acceptable substitutes in the future. The optical communications system and methods may also be modified for a variety of applications while remaining within the scope and spirit of the claimed invention, since the range of potential applications is great, and since it is intended that the present optical communications system and methods be adaptable to many such variations.

It will be appreciated that the methods described above at least substantially provide an improved method of compensating for optical signal degradation of signals propagating in optical fibers in DWDM telecommunications applications on a per-channel basis.

What is claimed is:

1. In an optical transmission system including:
   an optical transmitter for transmitting a plurality of independent wavelength channels;
   at least first and second spans, each said span respectively including:
      at least a first length of transmission optical fibre characterized by a positive dispersion coefficient; and
      at least a first length of dispersion-compensating optical fibre disposed after said length of transmission fibre and characterized by a negative dispersion coefficient for substantially compensating a large proportion of the group velocity delay accumulated by said wavelength channels in said first span;
   a first node module disposed after said first span including:
      an optical amplifying module; and
      a phase manipulation module for:
         a. substantially compensating for dispersion of said wavelength channels accumulated in said first span;
         b. substantially compensating for the remaining accumulated group delay in selected pairs of first and second wavelength channels; and
         c. modifying the phase of said second wavelength channel in said selected pair such that the cross talk between said selected pair of channels generated in the first link is at least partially compensated in the second link.

2. A system as claimed in claim 1 further including a second node module disposed after said second span including;
   an optical amplifying module; and
   a phase manipulation module for substantially compensating for the remaining accumulated group delay in selected pairs of third and fourth wavelength channels and for modifying the relative phase of said wavelength channels.

3. A system as claimed in claim 2 including:
   a plurality of sequentially disposed pairs of said first and second spans, each said first and second span interspersed between one of a plurality of respective first and second node modules; and
   a receiver module for receiving the transmitted wavelength channels.

4. In an optical transmission system including:
   an optical transmitter for transmitting a plurality of independent wavelength channels;
   at least first and second lengths of transmission optical fibre characterized by a first predetermined dispersion coefficient;
   at least first and second lengths of dispersion-compensating optical fibre characterized by a second predetermined dispersion coefficient for substantially compensating a large proportion of the group velocity delay accumulated by said wavelength channels in said respective lengths of transmission optical fibre, said first length of dispersion compensating fibre disposed after said first length of transmission fibre and said second length of dispersion compensating fibre disposed after said second length of transmission fibre;
   a first node module interposed between said first length of dispersion compensating fibre and said second length of transmission fibre including:
      a phase manipulation module configured to:
         substantially compensate the chromatic dispersion accumulated by said wavelength channels in said first length of transmission fiber;
         substantially compensate for the remaining accumulated group delay in selected pairs of first and second wavelength channels;
         modifying the phase of said second wavelength channel in said selected pair such that the modified phase of said second channel is substantially out of phase with said first wavelength channel in said selected pair; and
   a second node module disposed after said second length of dispersion compensating fibre including;
      an optical amplifying module; and
      a phase manipulation module for substantially compensating for the remaining accumulated group delay in selected pairs of third and fourth wavelength channels and for modifying the phase of said wavelength channels such that the modified phase of all said wavelength channels are substantially in-phase.

5. A system as claimed in claim 4 wherein said phase manipulation module modifies the phase of said wavelength channels in a decoupled manner such that nonlinear optical effects accumulated by any of said wavelength channels in said first length of transmission fibre are reversed in said second length of transmission fibre.

6. A system as claimed in claim 4 wherein said nonlinear optical effects include multi-channel mixing effects.

7. A system as claimed in claim 4 wherein said first and second predetermined dispersion coefficients are of opposite sign.

* * * * *